(12) United States Patent
Choi

(10) Patent No.: US 10,007,617 B2
(45) Date of Patent: Jun. 26, 2018

(54) DATA PROCESSING SYSTEM AND OPERATION METHOD THEREOF

(71) Applicant: SK hynix Inc., Gyeonggi-do (KR)

(72) Inventor: Hae-Gi Choi, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 133 days.

(21) Appl. No.: 15/153,477

(22) Filed: May 12, 2016

(65) Prior Publication Data

US 2017/0177494 A1 Jun. 22, 2017

(30) Foreign Application Priority Data

Dec. 21, 2015 (KR) .......................... 10-2015-0182777

(51) Int. Cl.
*G06F 12/10* (2016.01)
*G06F 17/30* (2006.01)

(52) U.S. Cl.
CPC ........ *G06F 12/10* (2013.01); *G06F 17/30961* (2013.01); *G06F 2212/65* (2013.01)

(58) Field of Classification Search
CPC ........................... G06F 12/10; G06F 17/30961
USPC .................................................. 711/202, 170
See application file for complete search history.

(56) References Cited

U.S. PATENT DOCUMENTS

| 8,943,283 B2 * | 1/2015 | Fiske .................. G06F 11/1456 711/162 |
| 9,058,253 B2 | 6/2015 | Kang et al. |
| 9,558,297 B1 * | 1/2017 | Bailey ............... G06F 17/30961 |
| 9,690,914 B2 * | 6/2017 | Stewart .................. G06F 21/125 |
| 2013/0346725 A1 * | 12/2013 | Lomet ..................... G06F 12/10 711/206 |
| 2014/0281360 A1 * | 9/2014 | Danilak ............ G06F 17/30292 711/206 |
| 2015/0193489 A1 * | 7/2015 | Bachar .............. G06F 17/30339 707/756 |

FOREIGN PATENT DOCUMENTS

| GB | 2460766 A | * 12/2009 | ........... G06F 21/125 |
| KR | 1020130064379 | 6/2013 | |

* cited by examiner

*Primary Examiner* — Pierre Miche Bataille
(74) *Attorney, Agent, or Firm* — IP & T Group LLP

(57) ABSTRACT

A data processing system may include: a host suitable for managing a plurality of data through a balance tree structure in which each node is set to a predetermined size, wherein each of the data includes information regarding the node in which the data is positioned, as node information; and a memory system having a plurality of physical storage areas each corresponding to the predetermined size, and suitable for gathering data included in two different new nodes based on the node information included in each of the data applied from the host, and storing the gathered data in one of the plurality of physical storage area.

18 Claims, 19 Drawing Sheets

** ONE DATA NODE INCLUDES MAXIMUM OF TWO INDEX DATA

** ONE DATA NODE INCLUDES MAXIMUM OF TWO INDEX DATA

** ONE DATA NODE INCLUDES MAXIMUM OF TWO INDEX DATA

** ONE DATA NODE INCLUDES MAXIMUM OF TWO INDEX DATA

** ONE DATA NODE INCLUDES MAXIMUM OF TWO INDEX DATA

** ONE DATA NODE INCLUDES MAXIMUM OF TWO INDEX DATA

FIG. 15

| LOGICAL ADDRESS (IDENTIFIED FOR EACH NODE) | PHYSICAL ADDRESS (PHYSICAL STORAGE AREA IDENTIFICATION VALUE : SPECIFIC VALUE) |
|---|---|
| LOGICAL ADDRESS OF DATA INCLUDED IN NODE<0> | 0 : 0 |
| LOGICAL ADDRESS OF DATA INCLUDED IN NODE<1> | 5 : 0 |
| LOGICAL ADDRESS OF DATA INCLUDED IN NODE<2> | 5 : 1 |
| LOGICAL ADDRESS OF DATA INCLUDED IN NODE<3> | 1 : 0 |
| LOGICAL ADDRESS OF DATA INCLUDED IN NODE<4> | 6 : 0 |
| LOGICAL ADDRESS OF DATA INCLUDED IN NODE<5> | 2 : 0 |
| LOGICAL ADDRESS OF DATA INCLUDED IN NODE<6> | 3 : 0 |
| LOGICAL ADDRESS OF DATA INCLUDED IN NODE<7> | 4 : 0 |
| LOGICAL ADDRESS OF DATA INCLUDED IN NODE<8> | 6 : 1 |

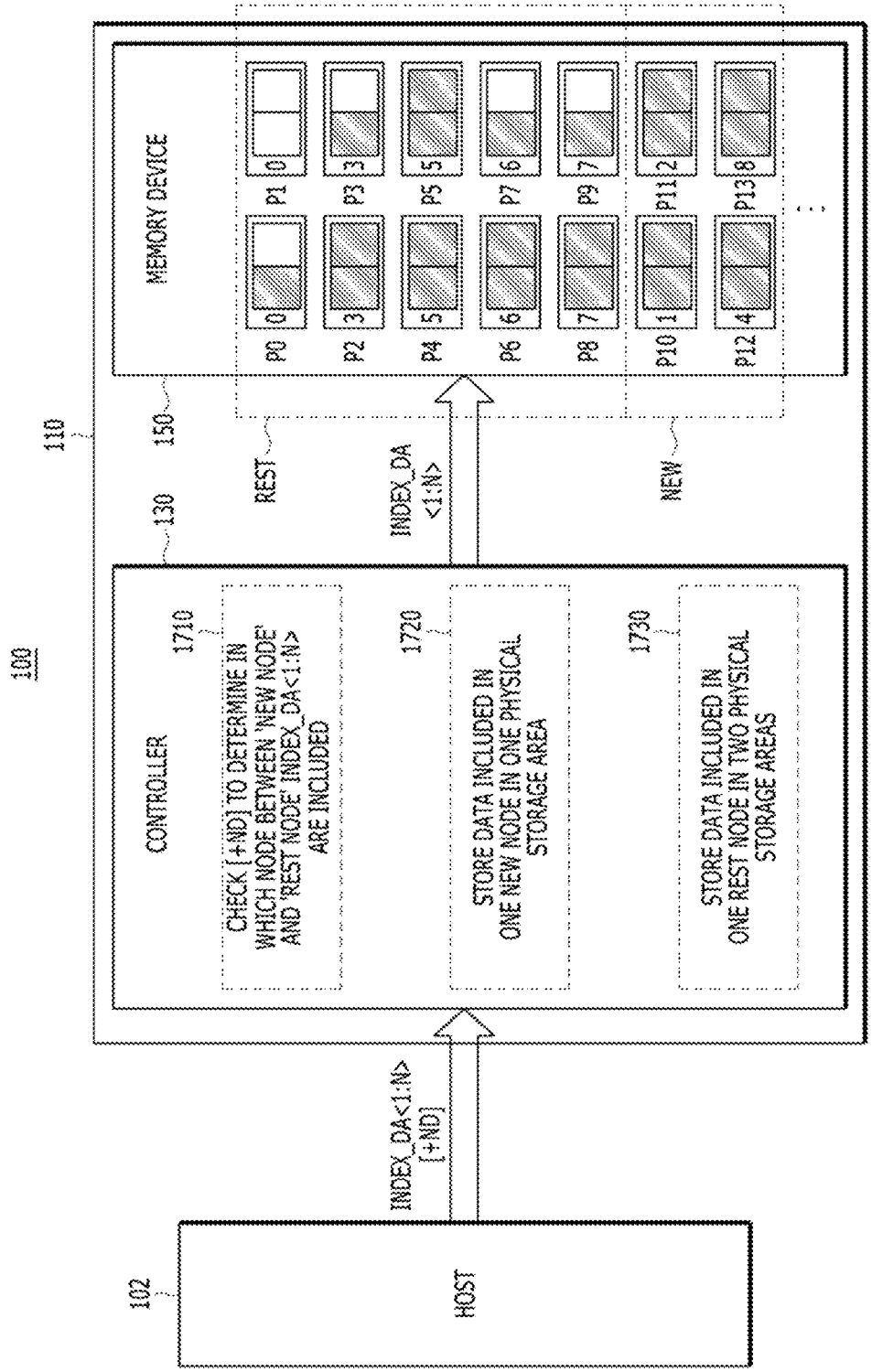

FIG. 18

| LOGICAL ADDRESS (IDENTIFIED FOR EACH NODE) | PHYSICAL ADDRESS (PHYSICAL STORAGE AREA IDENTIFICATION VALUE) |
|---|---|
| LOGICAL ADDRESS OF DATA INCLUDED IN NODE<0> | 0, 1 |
| LOGICAL ADDRESS OF DATA INCLUDED IN NODE<1> | 10 |
| LOGICAL ADDRESS OF DATA INCLUDED IN NODE<2> | 11 |
| LOGICAL ADDRESS OF DATA INCLUDED IN NODE<3> | 2, 3 |
| LOGICAL ADDRESS OF DATA INCLUDED IN NODE<4> | 12 |
| LOGICAL ADDRESS OF DATA INCLUDED IN NODE<5> | 4, 5 |
| LOGICAL ADDRESS OF DATA INCLUDED IN NODE<6> | 6, 7 |
| LOGICAL ADDRESS OF DATA INCLUDED IN NODE<7> | 8, 9 |
| LOGICAL ADDRESS OF DATA INCLUDED IN NODE<8> | 13 |

FIG. 19

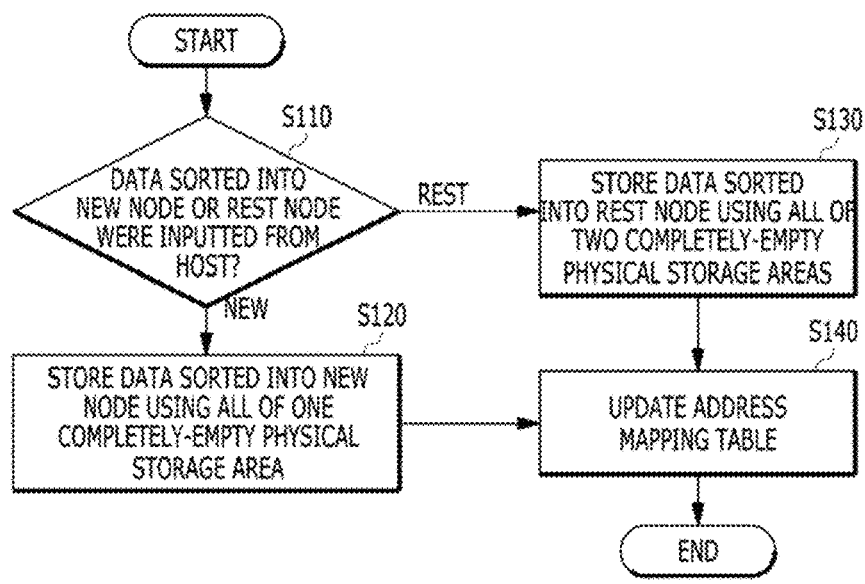

DATA PROCESSING SYSTEM AND OPERATION METHOD THEREOF

CROSS-REFERENCE TO RELATED APPLICATIONS

This application claims priority under 35 U.S.C. § 119 to Korean Patent Application No. 10-2015-0182777 filed on Dec. 21, 2015 in the Korean Intellectual Property Office, the disclosure of which is incorporated herein by reference in its entirety.

BACKGROUND

1. Field

The present invention relates generally to data processing systems and, more particularly, to a data processing system for managing a plurality of index data more efficiently.

2. Description of the Related Art

The computer environment paradigm has shifted to ubiquitous computing systems that may be used anytime and anywhere. Due to this, use of portable electronic devices, such as mobile phones, digital cameras, and notebook computers has rapidly increased. Portable electronic devices generally employ a memory system having one or more semiconductor memory devices used as main or auxiliary data storage devices.

Semiconductor memory devices generally provide excellent stability, durability, high information access speed, and low power consumption, since they have no moving parts. Well-known examples of semiconductor memory devices include universal serial bus (USB) memory devices, memory cards having various interfaces, and solid state drives (SSD).

SUMMARY

Various embodiments are directed to a data processing system capable of efficiently storing a plurality of index data which are managed in a balance tree (B-tree) structure and an operation method thereof.

In an embodiment, a data processing system may include: a host suitable for managing a plurality of data through a balance tree structure in which each node is set to a predetermined size. Each of the data includes information regarding the node in which the data is positioned, as node information; and a memory system having a plurality of physical storage areas each corresponding to the predetermined size, and suitable for gathering data included in two different new nodes based on the node information included in each of the data applied from the host, and storing the gathered data in one of the plurality of physical storage areas.

In the case of a rest node which is not the new node, the memory system may store data included in the rest node in one of the physical storage areas.

The memory system may all ovate two physical addresses, of which only specific values are different from each other, to the one of the plurality of physical storage areas and then may map the two physical address, of which only specific values are different from each other, to two different logical addresses indicating the two new nodes, respectively.

The node information may include: identification (ID) information for identifying the node in which the corresponding data is positioned; and indication information indicating whether the node in which the data is positioned is the new node.

When the data included in the new node which is sorted according to the indication information, among the plurality of data, are sorted into data of a first node including ID information of a first value and data of a second node including ID information of a second value, the memory system may map the two physical addresses, of which only specific values are different from each other, to two different logical addresses indicating the first and second nodes, respectively.

When the da to included in the rest node which is sorted according to the indication information, among the plurality of data, are sorted into data of a third node including ID information of a third value, the memory system may allocate one physical address to the one of the physical storage areas, and may map the allocated physical address to one logical address indicating the third node.

In an embodiment, a data processing system may include: a host suitable for managing a plurality of data through a balance tree structure in which each node is set to a first size. Each of the data includes information regarding the node in which the data is positioned, as node information; and a memory system having a plurality of physical storage areas each corresponding to a second size which is a one half of the first size, and suitable for storing data included in one new node in one of the plurality of physical storage area based on the node information included in each of the data applied from the host, and storing data included in one rest node in two physical storage areas among the plurality of physical storage areas, the rest node indicating a node which is not the new node.

The node information may include: identification (ID) information for identifying the node in which the corresponding data is positioned; and indication information indicating whether the node in which the data is positioned is the new node.

When the data included in the new node which is sorted according to the indication information, among the plurality of data are sorted into data of a first node including ID information of a first value and data of a second node including ID information of a second value, the memory system may map two different physical addresses corresponding to the two different physical storage areas to two different logical addresses indicating the first and second nodes, respectively.

When the data included in the rest node which is sorted according to the flag information, among the plurality of data, are sorted into data of a third node including ID information of a third value, the memory system may map any one of two different physical addresses corresponding to the two different physical areas to a logical address indicating the upper half of the third node, and may map the other physical address to a logical address indicating the lower half of the third node.

In an embodiment, an operation method of a data processing system which may include a host suitable for man aging a plurality of data through a balance tree structure in which each node is set to a predetermined size. Each of the data includes information regarding the node in which the data is positioned, as node information; and a memory system having a plurality of physical storage areas each corresponding to the predetermined size. An operation of the memory system may include: a separation step of separating the plurality of data into data included in a new node and data included in a rest node indicating a node which is not the new node, based on the node information included in each of the data applied from the host; and a first storage step of gathering data included in two different new nodes and storing the gathered data in one of the plurality of physical storage areas, after the separation step.

The memory system may further include a second storage step of storing the data included in the rest node in one of the physical storage areas, after the separation step.

The first storage step may include: allocating two physical addresses, of which only specific values are different from each other, to the one of the plurality of physical storage areas; and mapping the two physical addresses, of which only specific values are different from each other, to two different logical addresses indicating the two new nodes, respectively.

The node information may include: identification (ID) information for identifying the node in which the corresponding data is positioned; and indication information indicating whether the node in which the data is positioned is the new node.

When the data included in the new node which is sorted with reference to the indication information at the separation step are sorted into data of a first node including ID information of a first value and data of a second node including ID information of a second value, the mapping of the two physical addresses may include mapping the two physical addresses, of which only specific values are different from each other, to two different logical addresses indicating the first and second nodes, respectively.

When the data included in the rest node which is sorted with reference to the indication information at the separation step are sorted into data of a third node including ID information of a third value, the second storage step may include allocating one physical address to one of the physical storage areas, and mapping the allocated physical address to one logical address indicating the third node.

In an embodiment, an operation method of a data processing system which may include a host suitable for managing a plurality of data through a balance tree structure in which each node is set to a first size. Each of the data includes information regarding the node in which the data is positioned, as node information; and a memory system having a plurality of physical storage areas each corresponding to a second size which is a one half of the first size. An operation of the memory system may include: a separation step of separating the plurality of data into data included in a new node and data included in a rest node indicating a node which is not the new node, based on the node information included in each of the data applied from the host; a first storage step of storing data included in one new node in one of the plurality of physical storage areas after the separation step; and a second storage step of storing data included in one rest node in two physical storage areas among the plurality of physical storage areas after the separation step.

The node information may include: identification (ID) information for identifying the node in which the corresponding data is positioned; and indication information indicating whether the node in which the data is positioned is the new node.

When the data included in the new node which is sorted with reference to the indication information at the separation step are sorted into data of a first node including ID information of a first value and data of a second node including ID information of a second value, the first storage step may include mapping two different physical addresses corresponding to the two physical storage areas to o different logical addresses indicating the first and second nodes, respectively.

When the data included in the rest node which is sorted with reference to the flag information at the separation step are sorted into data of a third node including ID information of a third value, the second storage step may include mapping any one of two different physical addresses corresponding to the two different physical areas to a logical address indicating the upper half of the third node, and mapping the other physical address to a logical address indicating the lower half of the third node.

BRIEF DESCRIPTION OF THE DRAWINGS

FIG. 15 a diagram illustrating an example of mapping between logical addresses and physical addresses for index data in a data processing system, according to a first embodiment of the present invention.

FIG. 17 is a diagram a data processing system according to a second embodiment of the present invention.

FIG. 18 is a diagram illustrating an example of mapping between logical addresses and physical addresses for index data in a data processing system, according to a second embodiment of the present invention.

FIG. 19 is a flowchart illustrating an operation of a data processing system, according to a second embodiment of the present invention.

DETAILED DESCRIPTION

Figure 1:
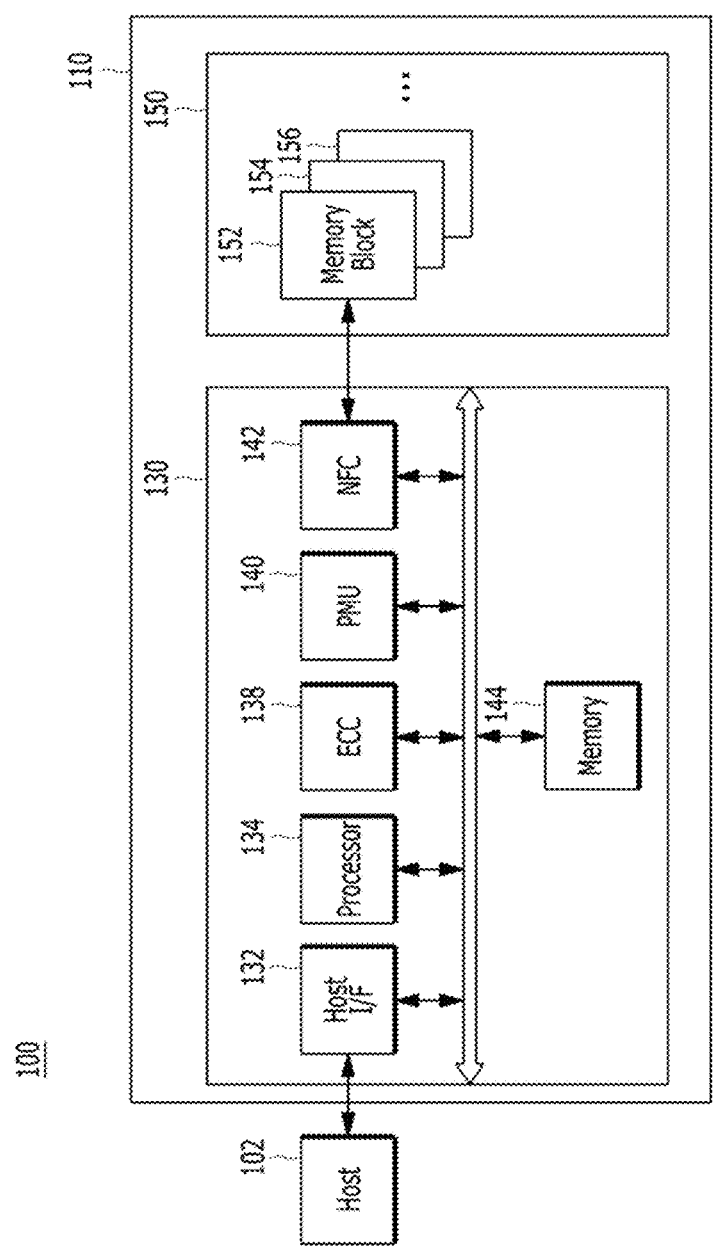
FIG. 1 is a diagram illustrating a data processing system including a memory system, according to an embodiment of the invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present disclosure.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, the various embodiments of the present disclosure will be described in details with reference to attached drawings.

Referring now to FIG. 1, a data processing system 100 is provided, according to an embodiment of the present invention. The data processing system 100 may include a host 102 and a memory system 110.

The host 102 may include any suitable electronic device. For example, the host 102 may include a portable electronic device such as a mobile phone, an MP3 player, a laptop computer and the like. The host may include a non-portable electronic device such as a desktop computer, a game player, a TV, a projector and the like.

The memory system 110 may store data to be accessed by host 102 in response to a request from the host 102. The memory system 110 may be used as a main memory system or an auxiliary memory system of the host 102. The memory system 110 may be implemented to be coupled electrically with the host 102, according to a protocol of a host interface. One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, smart media (SM) card, a memory stick, and the like.

The storage devices for the memory system 110 may be implemented with a volatile memory device, such as a dynamic random access memory (DRAM), a static random access memory (SRAM) and the like. Alternatively, the storage devices for the memory system 110 may be implemented a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 for storing data and a controller 130 for controlling storage of data in the memory device 150. The stored data in the memory device 150 may be accessed by the host 102.

The controller 130 and the memory device 150 may be integrated into a single semiconductor device. For instance, the controller 130 and the memory device 150 may be integrated into a semiconductor device configured as a solid state drive (SSD). Configuring the memory system 110 as a SSD, may generally allow a significant increase in an operation speed of the host 102.

The controller 130 and the memory device 150 may be integrated into a semiconductor device configured as a memory card, such as a Personal Computer Memory Card International Association (PCMCIA) card, a compact flash (CF) card, smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

Also, for example, the memory system 110 may be or comprise a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102. During a read operation, the memory device 150 may provide the stored data to the host 102. One or more memory devices 150 may be employed. The one or more memory devices 150 may be substantially identical. The one or more memory devices may be different memory devices. The memory device 150 may include one or more memory blocks 152, 154 and 156. Each of the memory blocks 152, 154 and 156 may include a plurality of pages. Each of the pages may include a plurality of memory cells coupled electrically to a plurality of word lines (WL). The memory device 150 may be a nonvolatile memory device capable of retaining stored data even when a power supply is interrupted or turned off. According to an embodiment, the memory device may be a flash memory. The memory device may be a flash memory device having a three-dimensional (3D) stack structure. Examples of a non-volatile memory device 150 having a three-dimensional (3D) stack structure are described later herein with reference to FIGS. 2 to 11.

The controller 130 may control the overall operation of the memory device 150, such as, read, write, program and/or erase operations. Generally, the controller 130 may control the memory device 150 in response to a request from the host 102. For example, the controller 130 may provide data read from the memory device 150, to the host 102, in response to a read request from the host 102. Or, also as an example, the controller may store data provided from the host 102 into the memory device 150 in response to a write request.

Any suitable controller may be used. For example, the controller 130 may include a host interface unit 132 a processor 134, an error correction code (ECC) unit 138, a power management unit (PMU) 140, a NAND flash controller (NFC) 142, and a memory 144.

The host interface unit 132 may process commands and/or data provided from the host 102. The host interface unit 132 may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), integrated drive electronics (IDE) and the like. The host interface unit 132 may include any suitable circuits, systems or devices suitable for communicating with the host 102 and the other components of the controller 130 as may be needed.

The ECC unit 138 may detect and correct errors of the data read from the memory device 150 during a read operation. Various detection and correction techniques may be employed. For example, if the number of the error bits detected by the ECC unit 138 is greater than or equal to a threshold number of correctable error bits, the ECC unit 138 may not correct the error bits and output an error correction fail signal indicating failure in correcting the error bits.

The ECC unit 138 may perform an error correction operation based on any suitable error correction scheme. For example, the ECC unit 138 may perform an error correction operation based on a coded modulation scheme, such as, for example, a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any suitable circuits, systems or devices required for an error detection and correction operation.

The PMU 140 may provide and manage electric power for the controller 130. For example, the PMU 140 may provide and manage electric power for the various components of the controller 130 as may be needed.

The NFC 142 may serve as a memory interface between the controller 130 and the memory device 150 to allow the controller 130 to control the memory device 150 in response to a request from the host 102. For example, the NFC 142 may generate control signals for the memory device 150. The NFC may process data under the control of the processor 134, for example, when the memory device 150 is a flash memory especially a NAND flash memory.

The memory 144 may serve as a working memory of the memory system 110 and the controller 130, and store data for driving the memory system 110 and the controller 130. For example, when the controller 130 controls the operations of the memory device 150 the memory 144 may store data used by the controller 130 and the memory device 150 for such operations as read, write, program and erase operations.

The memory 144 may be or comprise a volatile memory. For example, the memory 144 may be or comprise a static random access memory (SRAM) or a dynamic random access memory (DRAM). As described above, the memory 144 may store data used by the host 102 and the memory device 150 for read and/or write operations. The memory 144 may be or comprise a program memory, a data memory, a write buffer, a read buffer, a map buffer, and the like.

The processor 134 may control the general operations of the memory system 110. For example, the processor 134 may control a write operation for the memory device 150, in response to a write request from the host 102. Also, for example, the processor 134 may control a read operation for the memory device 150, in response to a read request from the host 102. The processor 134 may drive a firmware, also referred to as a flash translation layer (FTL), for controlling the genera operations of the memory system 110. The processor 134 may be implemented with a microprocessor, a central processing unit (CPU) and the like. Any suitable processor may be used.

For example, a management unit (not shown) may be included in the processor 134 for performing bad block management of the memory device 150. Accordingly, the management unit may find bad memory blocks included in the memory device 150, i.e., memory blocks which are in an unsatisfactory condition for further use, and perform a bad block management operation the bad memory blocks. For example, when a flash memory, such as a NAND flash memory is employed as the memory device 150, a program failure may occur during a write operation due to inherent characteristics of a NAND logic function. During a bad block management, the data of the program-failed memory blocks (e.g., the bad memory blocks) may be programmed into a new memory block. The bad blocks due to a program fail may seriously deteriorate the utilization efficiency of a memory device, especially one having a 3D stack structure and thus negatively affect the reliability of the memory system 110.

Figure 2:
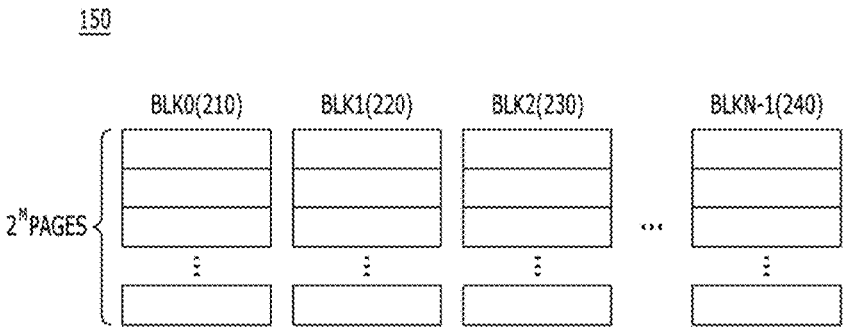
FIG. 2 is a diagram illustrating an example of a memory device employed in the memory system shown in FIG. 1.

Referring to FIG. 2 the memory device 150 may include a plurality of memory blocks, for example, zeroth to $(N-1)^{th}$ blocks 210 to 240, where N is a positive integer. Each of the plurality of memory blocks 210 to 240 may include a plurality of pages, for example, $2^M$ number of pages ($2^M$ PAGES), here M is a positive integer. Each of the plurality of pages may include a plurality of memory cells to which a plurality of word lines may be coupled electrically. It is noted that any number of suitable blocks and pages per block may be employed.

The memory blocks may be single level cell (SLC) memory blocks and/or multi-level cell (MLC) memory blocks, according to the number of bits which may be stored in each memory cell. An SLC memory block may include a plurality of pages which are implemented with memory cells each of which is capable of storing 1-bit data. An MLC memory block may include a plurality of pages which are implemented with memory cells each of which is capable of storing multi-bit data, for example, two or more-bit data. A MLC memory block including a plurality of pages which are implemented with memory cells each of which is capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
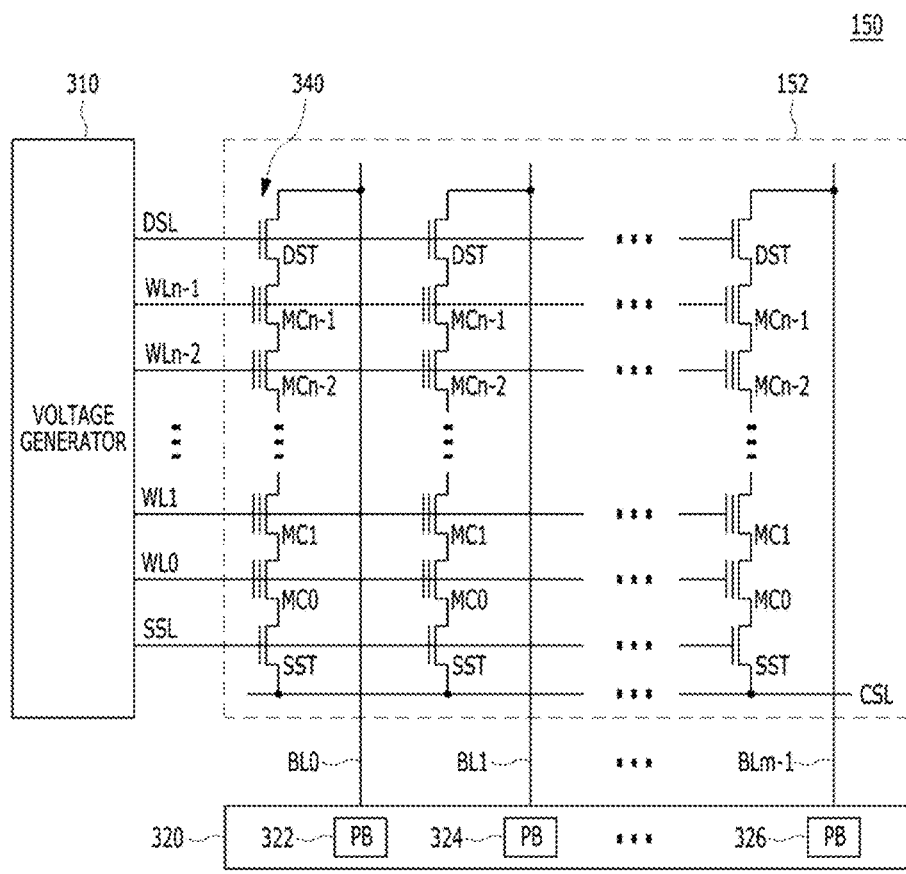
FIG. 3 is a circuit diagram illustrating an example of a memory block that may be employed in a memory device, according to an embodiment of the invention.

Referring to FIG. 3, a memory block 152 of the memory device 150 may include a plurality of cell strings 340 coupled electrically to bit lines BL0 to BLm-1, respectively. Each cell string 340 may include at least one drain select transistor DST and at least one source select transistor SST. A plurality of memory cells or a plurality of memory cell transistors MC0 to MCn-1 may be coupled electrically in series between the select transistors DST and SST. The respective memory cells MC0 to MCn-1 may consist of multi-level cells (MLC) each of which stores data information of a plurality of bits. The memory cells may have any suitable architecture.

In FIG. 3, 'DSL' denotes a drain select line, 'SSL' denotes source select line, and 'CSL' denotes a common source line.

FIG. 3 shows, as an example, a memory block 152 configured by NAND flash memory cells. It is to be noted, however, that the memory block 152 is not limited to NAND flash memory and may be realized, in other embodiments, by NOR flash memory, hybrid flash memory having at least two kinds of memory cells combined, or a NAND flash memory having a controller built in a memory chip. Also, the operation characteristics of a semiconductor device may be applied to not only a flash memory device in which a charge storing layer is configured by conductive floating gates but also to a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages, for example, a program voltage, a read voltage or a pass voltage, to be supplied to respective word lines according to an operation mode. The voltage generator 310 may generate voltages to be supplied to bulks, for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines, under the control of the control circuit.

A read/write circuit 320 of the memory device 150 may be controlled by the control circuit, and may serve as a sense amplifier or write driver according to an operation mode. During a verification/normal read operation, the read/write circuit 320 may serve as a sense amplifier for reading data from the memory cell array. Also, during a program operation, the read/write circuit 320 may serve as a write driver for driving bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to the columns (or bit lines) or pairs of the columns (or pairs of bit lines). Each of the page buffers 322, 324 and 326 may include a plurality of latches (not shown).

Figure 4:
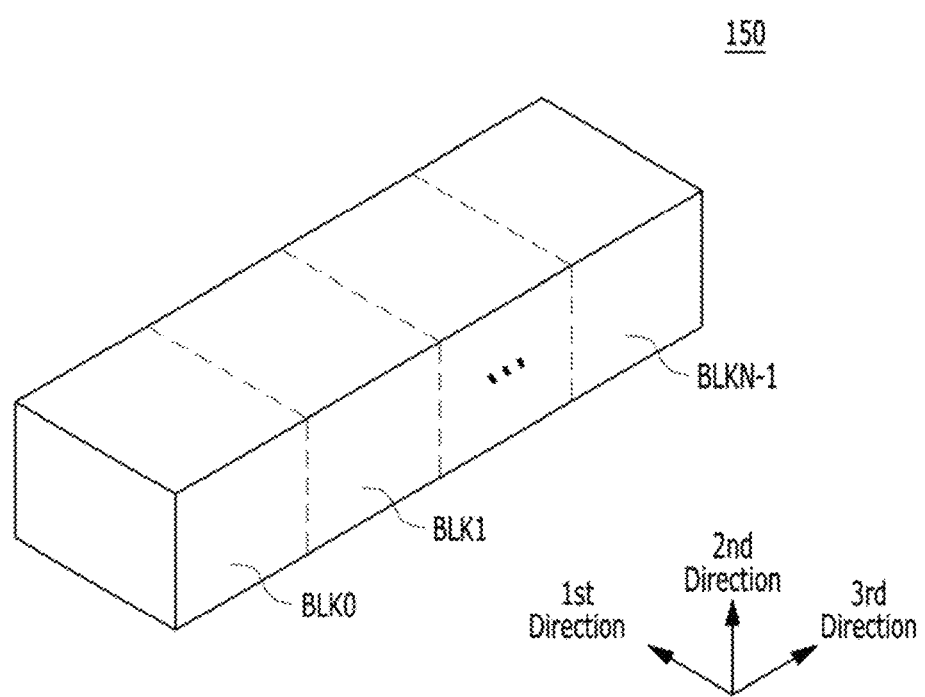
FIGS. 4 to 11 are diagrams illustrating examples of a memory device that may be employed in a memory device, according to various embodiments of the invention.

FIG. 4 is a block diagram illustrating an example of the plurality of memory blocks 152 to 156 of the memory device 150, according to an embodiment of the present invention.

As shown in FIG. 4, the memory device 150 may include a plurality of memory blocks BLK0 to BLKN-1. Each of the memory blocks BLK0 to BLKN-1 may be realized in a 3D structure or a vertical structure. The respective memory blocks BLK0 to BLKN-1 may include a plurality of structures extending in first to third directions, for example, an x-axis direction, a y-axis direction and a z-axis direction.

Figure 8:
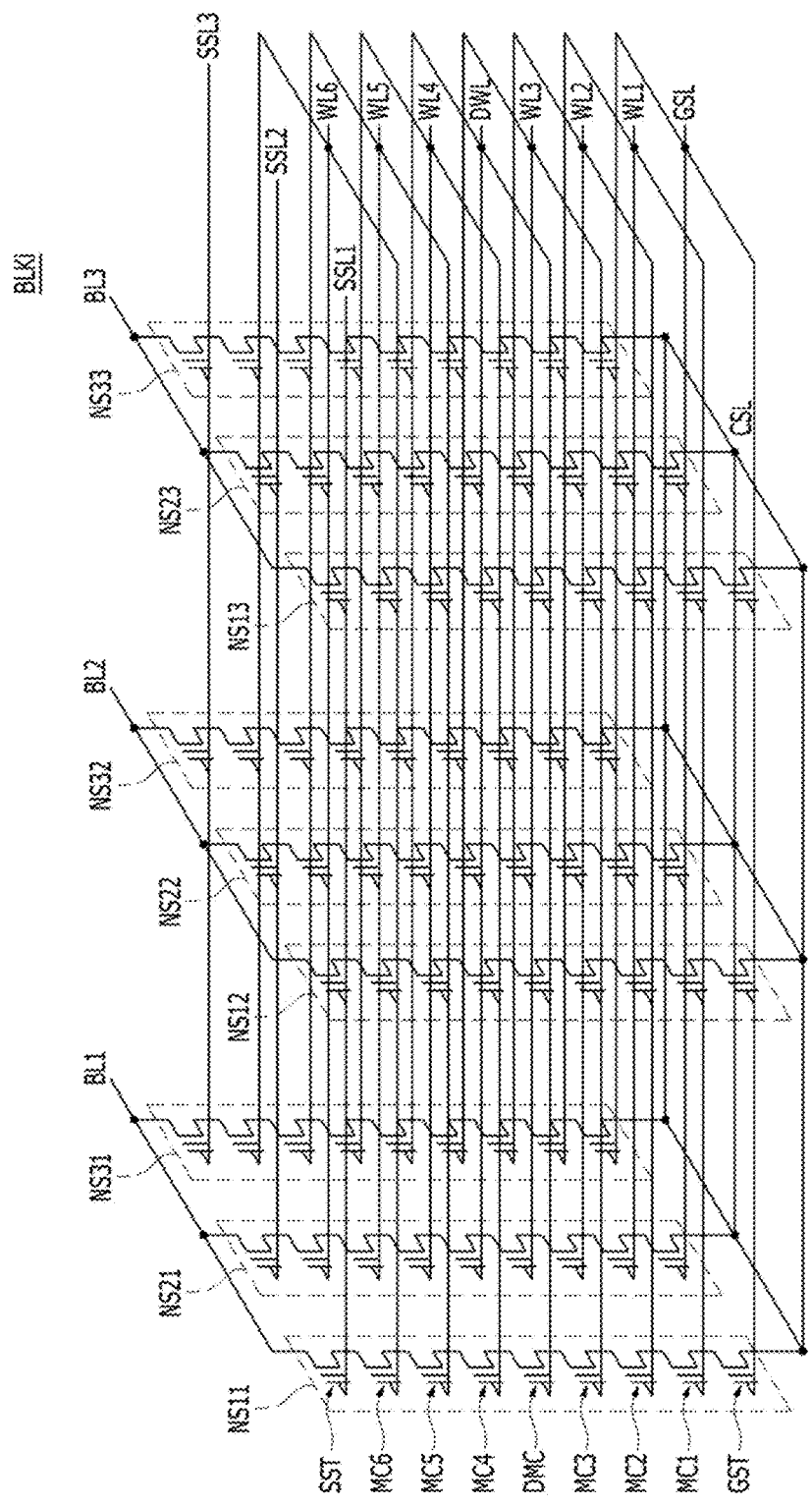

The respective memory blocks BLK0 to BLKN-1 may include a plurality of NAND strings NS extending in the second direction (FIG. 8). The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. The respective memory blocks BLK0 to BLKN-1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
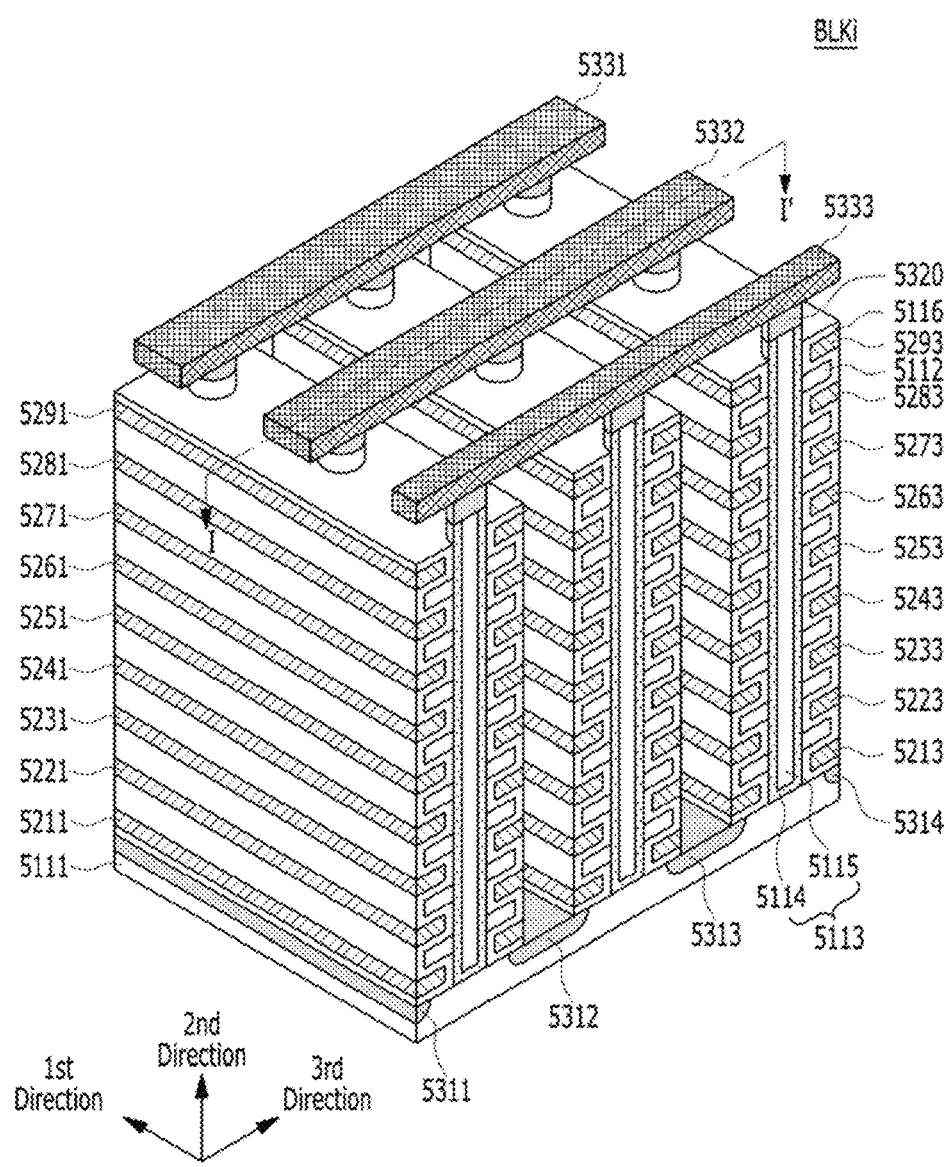
Figure 6:
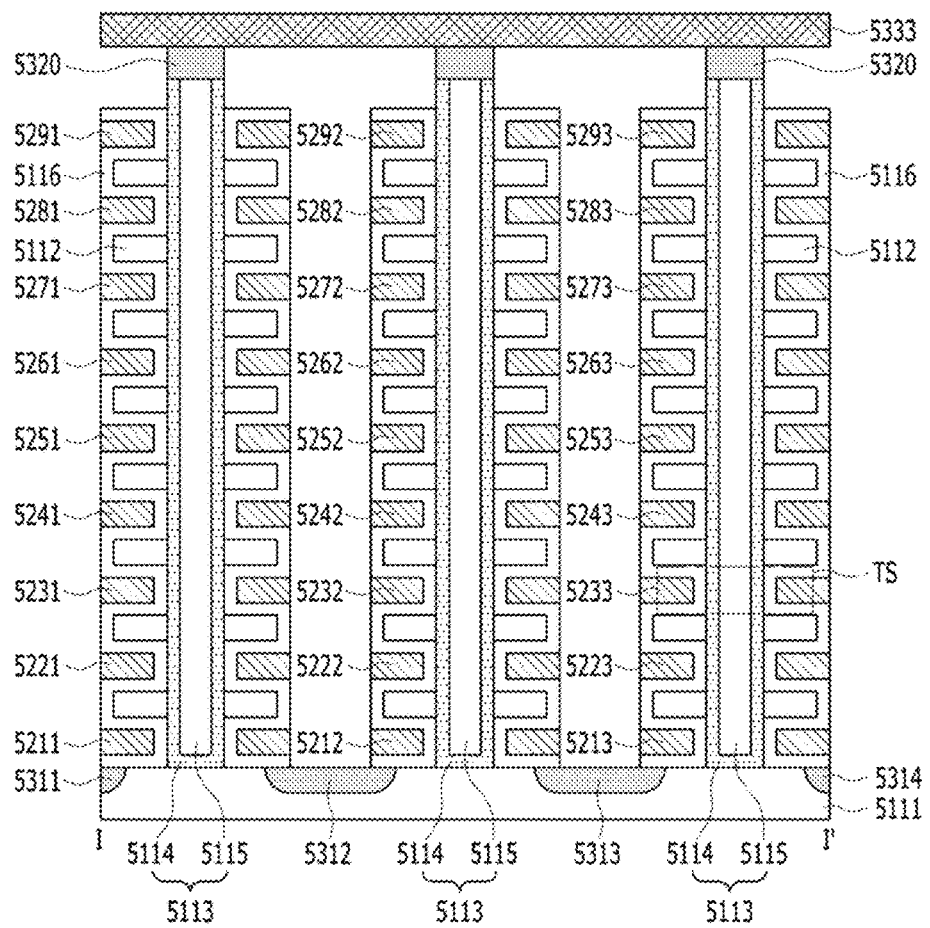

FIG. 5 is a perspective view of one memory block BLKi of the plurality memory blocks BLK0 to BLKN-1 shown in FIG. 4. FIG. 6 is a cross-sectional view taken along a line I-I' of the memory block BLKi shown in FIG. 5.

Referring to FIGS. 5 and 6, memory block BLKi may include a structure extending in the first to third directions.

The memory block may include a substrate 5111 including a silicon material doped with a first type impurity. For example, the substrate 5111 may include a silicon material doped with a p-type impurity. The substrate 5111 may be a p-type well, for example, a pocket p-well. The substrate 5111 may further include an n-type well surrounding the p-type well. Although, in the embodiment of the present invention, the substrate 5111 is exemplified as being the p-type silicon, it is to be noted that the substrate 5111 is not limited to the p-type silicon.

A plurality of doping regions 5311 to 5314 extending in the first direction may be provided over the substrate 5111. The doping regions are spaced apart at regular intervals in the third direction. The plurality of doping regions 5311 to 5314 may contain a second type impurity that is different from that of the impurity used in substrate 5111. For example, the plurality of doping regions 5311 to 5314 may be doped with an n-type impurity. Although in the embodiment of the present invention, first to fourth doping regions 5311 to 5314 are exemplified as being the n-type, it is noted that they are not limited to the n-type.

In the region over the substrate 5111 between the first and second doping regions 5311 and 5312, a plurality of dielectric material regions 5112 extending in the first direction may be spaced apart at regular intervals in the second direction. The dielectric material regions 5112 may also be separated from the substrate 5111 by a preset distance in the second direction. Each of the dielectric material regions 5112 may be separated from one other by a preset distance in the second direction. The dielectric materials 5112 may include any suitable dielectric material, such as, silicon oxide.

In the regions over the substrate 5111 between two consecutive doping regions, for example, between doping regions 5311 and 5312, a plurality of pillars 5113 are spaced apart at regular intervals in the first direction. The plurality of pillars 5113 extend in the second direction and may pass through the dielectric material regions 5112 so that they may be coupled electrically with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. Although, in the embodiment of the present invention, the surface layer 5114 is exemplified as including p-type silicon, the surface layer 5114 is not limited to the p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as silicon oxide.

In the regions between the first and second doping regions 5311 and 5312, a dielectric layer 5116 may be provided along exposed surfaces of the dielectric material regions 5112, the pillars 5113 and the substrate 5111. A thickness of the dielectric layer 5116 may be less than one half of the distance between the dielectric material regions 5112. In other words, a region of a material other than the dielectric material 5112 and the dielectric layer 5116 may be provided between (i) the dielectric layer 5116 below the bottom surface of a first dielectric material of the dielectric material regions 5112 and (ii) the dielectric layer 5116 provided over the top surface of a second dielectric material of the dielectric material regions 5112. The dielectric material regions 5112 may lie below the first dielectric material.

In the regions between consecutive doping regions such as in the region between the first and second doping regions 5311 and 5312, a plurality of conductive material regions 5211 to 5291 may be provided over an exposed surface of the dielectric layer 5116. The plurality of the conductive material regions extending in the first direction may be spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 extending in the first direction may be provided between the dielectric material region 5112 adjacent to the substrate 5111 and the substrate 5111. In particular, the conductive material region 5211 extending in the first direction may be provided between (i) the dielectric layer 5116 disposed over the substrate 5111 and (ii) the dielectric layer 5116 disposed below the bottom surface of the dielectric material region 5112 adjacent to the substrate 5111.

Each of the conductive material regions 5211 to 5291 extending in the first direction may be provided between (i) a dielectric layer 5116 disposed over the top surface of one of the dielectric material regions 5112 and (ii) the dielectric layer 5116 disposed below the bottom surface of the next dielectric material region 5112. The conductive material regions 5221 to 5281 extending in the first direction may be provided between the dielectric material regions 5112. The top conductive material region 5291 extending in the first direction may be provided over the uppermost dielectric material 5112. The conductive material regions 5211 to 5291 extending in the first direction may be made of or include a metallic material. The conductive material regions 5211 to 5291 extending in the first direction may be made of or include a conductive material such as polysilicon.

In the region between the second doping region 5312 and third doping region 5313, the same structures as the structures between the first and second doping regions 5311 and 5312 may be provided. For example, in the region between the second and third doping regions 5312 and 5313, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 extending in the first direction may be provided.

In the region between the third doping region 5313 and a fourth doping region 5314, the same structures as between the first and second doping regions 5311 and 5312 may be provided. For example, in the region between the third and fourth doping regions 5313 and 5314, the plurality of dielectric material regions 5112 extending In the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 extending in the first direction may be provided.

Drains 5320 may be respectively provided over the plurality of pillars 5113. The drains 5320 may be made of silicon materials doped with second type impurities. The drains 5320 may be made of silicon materials doped with n-type impurities. Although for the sake of convenience of explanation, the drains 5320 are exemplified including n-type silicon, it is noted that the drains 5320 are not limited to the n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 extending in the third direction may be provided over the drains 5320. Each of the conductive material regions 5331 to 5333 may be extendedly disposed over the drains 5320 serially arranged in the third direction with a preset separation distance to each other in the first direction. The respective conductive material regions 5331 to 5333 may be coupled electrically with the drains 5320 therebelow. The drains 5320 and the conductive material regions 5331 to 5333 extending in the third direction may be coupled electrically with through contact plugs. The conductive material regions 5331 to 5333 extending in the third direction may be made of a metallic material. The conductive material regions 5331 to 5333 extending in the third direction may be made of a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 extending in the first direction. The respective pillars 5113 may form NAND strings NS together with the dielectric layer 5116 and the conductive material regions 5211 to 5291, 5212 to 5292 and 5213 to 5293 extending in the first direction. Each NAND string NS may include a plurality of transistor structures TS.

Figure 7:
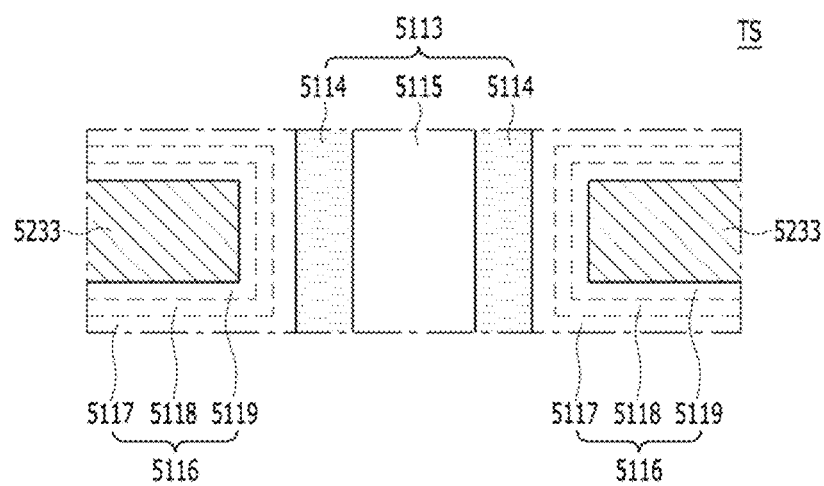

Referring now to FIG. 7 in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. For example, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation, the surface layer 5114 of p-type silicon in each of the pillars 5113 will be referred to as a body in the second direction.

The memory block BLKi may include the plurality of pillars 5113. For example, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transit or structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 extending in the first direction. For example, the gates or the control gates may extend in the first direction and form word lines and at least two select lines including at least one source select line SSL and at least one ground select line GSL.

The conductive material regions 5331 to 5333 extending in the third direction may be coupled electrically to one end of the NAND strings NS. The conductive material regions 5331 to 5333 ex tending in the third direction may serve as bit lines BL. For example, in one memory block BLKi, the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

For example, the memory block BLKi may include a plurality of NAND strings NS extending in a direction perpendicular to the substrate 5111 e.g., the second direction and may serve as a NAND flash memory block, for example, of a charge capturing type memory, in which the plurality of NAND strings NS are coupled electrically to one-bit line BL.

Although it is illustrated in FIGS. 5 to 7 that the conductive material regions 5211 to 5291, 5212 to 5292 and 5213 to 5293 extending in the first direction are provided by nine (9) layers, it is noted that the conductive material regions 5211 to 5291, 5212 to 5292 and 5213 to 5293 extending in the first direction are not limited thereto. For example, conductive material regions extending in the first direction may be provided in eight (8) layers, sixteen (16) layers or any multiple layers. For example, in one NAND string NS, the number of transistors may be 8, 16 or more.

Although it i illustrated in FIGS. 5 to 7 that three (3) NAND strings NS are coupled electrically to one-bit line BL, it is noted that the embodiment is not limited thereto. In the memory block BLKi, m NAND strings NS may be coupled electrically to one-bit line BL, m being a positive integer. The number of conductive material regions 5211 to 5291, 5212 to 5292 and 5213 to 5293 extending in the first direction and the number of common source lines 5311 to 5314 may be varied with the number of NAND strings NS which are coupled electrically to one-bit line BL.

Further, although it is illustrated in FIGS. 5 to 7 that three (3) NAND strings NS are coupled electrically to one conductive material extending in the first direction, it is noted that the embodiment is not limited thereto. For example, n NAND strings NS may be coupled electrically to one conductive material extending in the first direction, n being a positive integer. The number of bit lines 5331 to 5333 may be varied with the number of NAND strings NS which are coupled electrically to one conductive material extending in the first direction.

Referring to FIG. 8, in a block BLKi having the first structure, a plurality of NAND strings NS11 to NS31 may be provided between a first bit line BL1 and a common source line CSL. The first bit line BL1 may correspond to the conductive material region 5331 of FIGS. 5 and 6, extending in the third direction. NAND strings NS12 to NS32 may be provided between a second bit line BL2 and the common source line CSL. The second bit line BL2 may correspond to the conductive material region 5332 of FIGS. 5 and 6 extending in the third direction. NAND strings NS13 to NS33 may be provided between a third bit line BL3 and the common source line CSL. The third bit line BL3 may correspond to the conductive material region 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC1 and MC6 may be provided between the source select transistor SST and the ground select transistor GST of each NAND string NS.

In this example, the NAND strings NS may be defined by units of rows and columns. The NAND strings NS which are coupled electrically to one-bit line may form one column. The NAND strings NS11 to NS31 which are coupled electrically to the first bit line BL1 may correspond to a first column. The NAND strings NS12 to NS32 which are coupled electrically to the second bit line BL2 may correspond to a second column. The NAND strings NS13 to NS33 which are coupled electrically to the third bit line BL 3 may correspond to a third column. The NAND strings NS which are coupled electrically to one source select line SSL may form one row. The NAND strings NS11 to NS13 which are coupled electrically to a first source select line SSL1 may form a first row. The NAND strings NS21 to NS23 which are coupled electrically to a second source select line SSL2 may form a second row. The NAND strings NS31 to NS33 which are coupled electrically to a third source select line SSL3 may form a third row.

In each NAND string NS, a height may be defined. In each NAND string NS, the height of the memory cell MC1 adjacent to the ground select transistor GST may have, for example, a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may have, for example, a value '7'.

The source select transistors SST of the NAND strings NS arranged in the same row may share the source select line SSL. The source select transistors SST of the NAND strings NS ranged in different rows may be respectively coupled electrically to the different source select lines SSL1, SSL2 and SSL3.

The memory cells at the same height in the NAND strings NS in the same row may share a word line WL. For example, at the same height, the word lines WL coupled electrically to the memory cells MC of the NAND strings NS in different rows may be coupled electrically with each other. Dummy memory cells DMC at the same height in the NAND strings NS of the same row may share a dummy word line DWL. For example, at the same height or level, the dummy word lines DWL coupled electrically to the dummy memory cells DMC of the NAND strings NS in different rows may be coupled electrically with each other.

The word lines WL or the dummy word lines DWL located at the same level or height or layer may be coupled electrically with each other for each of the layers where the conductive material regions 5211 to 5291, 5212 to 5292 and 5213 to 5293 extending in the first direction may be provided. The conductive material regions 5211 to 5291, 5212 to 5292 and 5213 to 5293 extending in the first direction may be coupled electrically in common to upper layers through contacts. In other words, the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be coupled electrically in common to the ground select line GSL.

The common source line CSL may be coupled electrically in common to the NAND strings NS. Over the active regions over the substrate 5111, the first to fourth doping regions 5311 to 5314 may be coupled electrically. The first to fourth doping regions 5311 to 5314 may be coupled electrically in common to an upper layer through contacts.

For example, as shown in FIG. 8, the word lines WL of the same height or level may be coupled electrically to each other. Accordingly, when a word line WL at a certain height is selected, all NAND strings NS which are coupled electrically to the selected word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, the NAND strings NS arranged in the same row as the selected source line may be selected.

Furthermore, by selecting one of the bit lines BL1 to BL3, the NAND strings NS arranged in the same column as the selected bit line may be selected. Accordingly, only the NAND strings NS arranged in the sale row as the selected source and the same column as the selected bit line may be selected.

In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups, memory cells, for example, MC1 to MC3, adjacent to the ground select transistor GST may be referred to as a lower memory cell group, and remaining memory cells, for example, MC4 to MC6, adjacent to the string select transistor SST may be referred to as an upper memory cell group.

Herein below, detailed descriptions will be made with reference to FIGS. 9 to 11, which show a memory device in a memory system, according to an embodiment implemented with a three-dimensional (3D) nonvolatile memory device different from the first structure.

Figure 9:
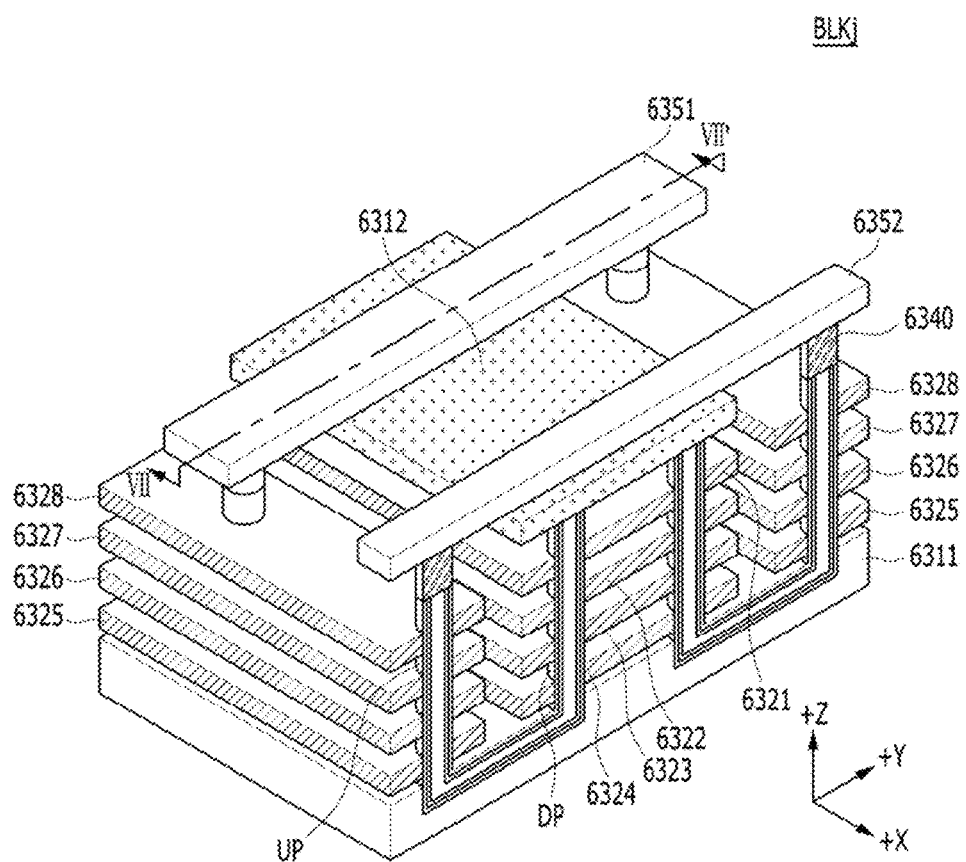
Figure 10:
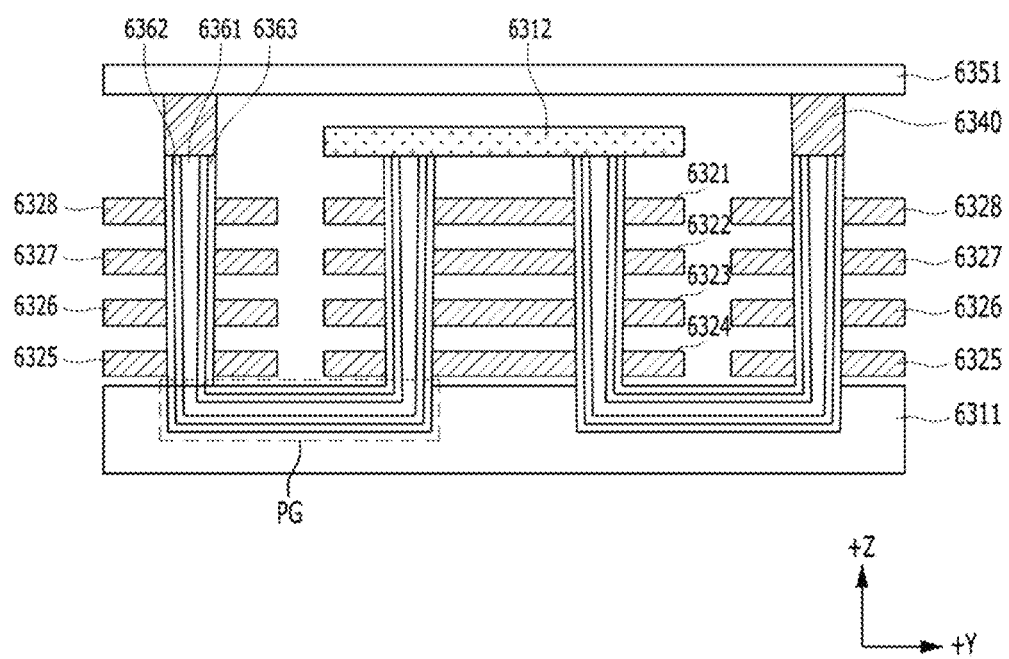

FIG. 9 is a perspective view schematically illustrating a memory device implemented with a three-dimensional (3D) nonvolatile memory device, which is different from the first structure described above with reference to FIGS. 5 to 8 and showing a memory block BLKj of the plurality of memory blocks of FIG.4 FIG.10 is a cross-sectional view illustrating the memory block BLKj taken along the line VII-VII' of FIG. 9.

Referring to FIGS. 9 and 10, the memory block BLKj may include structures extending in the first to third directions and may include a substrate 6311. The substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type silicon, it is noted that the substrate 6311 is not limited to the p-type silicon.

First to fourth conductive material regions 6321 to 6324 extending in an x-axis direction and a y-axis direction are provided over the substrate 6311. The first to fourth conductive material regions 6321 to 6324 may be separated by a preset distance in the z-axis direction.

Fifth to eighth conductive material regions 6325 to 6328 extending in the x-axis direction and the y-axis direction may be provided over the substrate 6311. The fifth to eighth conductive material regions 6325 to 6328 may be separated by the preset distance in the z-axis direction. The fifth to eighth conductive material regions 6325 to 6328 may be separated from the first to fourth conductive material regions 6321 to 6324 in the y-axis direction.

A plurality of lower pillars DP passing through the first to fourth conductive material regions 6321 to 6324 may be provided. Each lower pillar DP may extend in the z-axis direction. Also, a plurality of upper pillars UP passing through the fifth to eighth conductive material regions 6325 to 6328 may be provided. Each upper pillar UP may extend in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 extending in the y-axis direction may be provided over the drains 6340.

The first and second upper conductive material regions 6351 and 6352 may be spaced apart along the x-axis direction The first and second upper conductive material regions 6351 and 6352 may be formed of a metal. The first and second upper conductive material regions 6351 and 6352 and the drains 6340 may be coupled electrically with each other through contact plugs. The first and second upper conductive material regions 6351 and 6352 may serve as first and second bit lines BL1 and BL2, respectively.

The first conductive material 6321 may serve as a source select line SSL. The second conductive material 6322 may serve as a first dummy word line DWL1. The third and fourth conductive material regions 6323 and 6324 may serve as first and second main word lines MWL1 and MWL2, respectively. The fifth and sixth conductive material regions 6325 and 6326 may serve as third and fourth ma in word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive material regions 6321 to 6324 adjacent to the lower pillar DP may form a lower string. The up per pillar UP and the fifth to eighth conductive material regions 6325 to 6328 adjacent to the upper pillar UP may form an upper string. The lower string and the upper string may be coupled electrically with each other through the pipe gate PG. One end of the lower string be coupled electrically to the doping material 6312 of the second type which serves as the common source line CSL. One end of the upper string may be coupled electrically to a corresponding bit line through the drain 6340. One lower string and one upper string may form one swell string which is coupled electrically between the doping material 6312 serving as the common source line CSL and a corresponding one of the upper conductive material layers 6351 and 6352 serving as the bit line BL.

For example, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above detail with reference to FIG. 7, a detailed description thereof will be omitted herein.

Figure 11:
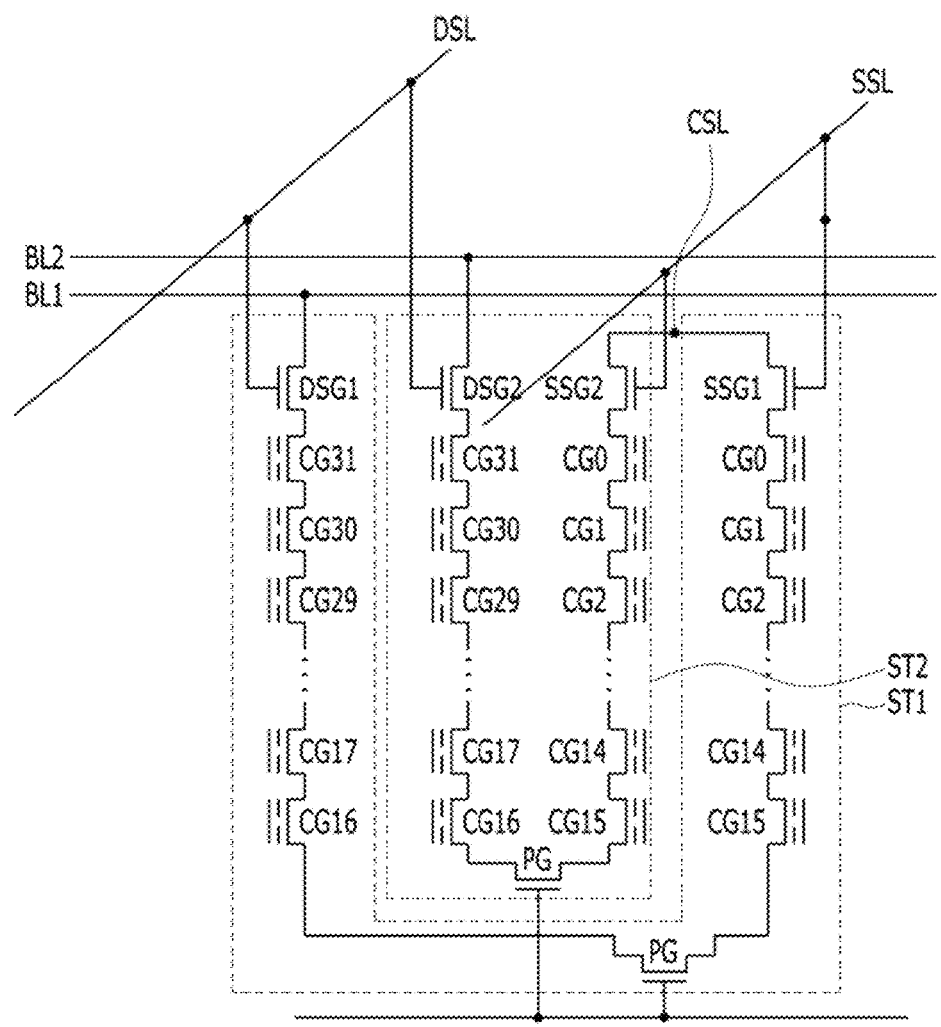

FIG. 11 is a circuit diagram illustrating the equivalent circuit of the memory block BLKj having the second structure as described above with reference to FIGS. 9 and 10. For the sake of convenience only a first string ST1 and a second string ST2 are shown, forming a pair in the memory block BLKj in the second structure.

Referring to FIG. 11, in the memory block BLKj having the second structure, a plurality of cell strings, each of which is implemented with one upper string and one lower string coupled electrically through the pipe gate PG as described above with reference to FIGS. 9 and 10, may be provided, in such a way as to define a plurality of pairs.

For example, in memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first and the second strings ST1 and ST2 may be coupled electrically to the same drain select line DSL and the same source select line SSL. The first string ST1 may be coupled electrically to a first bit line BL1. The second string ST2 may be coupled electrically to a second bit line BL2.

Although FIG. 11 shows the first string ST1 and the second string ST2 are coupled electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled electrically to the same drain select line DSL and the same bit line BL, the first string ST1 may be coupled electrically to a first source select line SSL1 and the second string ST2 may be coupled electrically a second source select line SSL2.

<A Balance Tree (B-tree) Structure>

The operation of managing index data will be described as follows.

The index data may be defined as information required for accessing the contents of user data.

Accordingly, the host 102 of FIG. 1 may access user data having a relatively large size through index data having a relatively small size.

For example, in order for the host 102 to rapidly access desired user data, it is important to quickly find index data corresponding to the user data. Thus, the host 102 may manage the index data in a tree structure.

For example, when the host 102 manages a plurality of index data in a balance tree (B-tree) structure the host 102 may access any data among the plurality of index data at the same amount of time. Thus, the B-tree structure is frequently used for managing a plurality of index data.

Figure 12A:
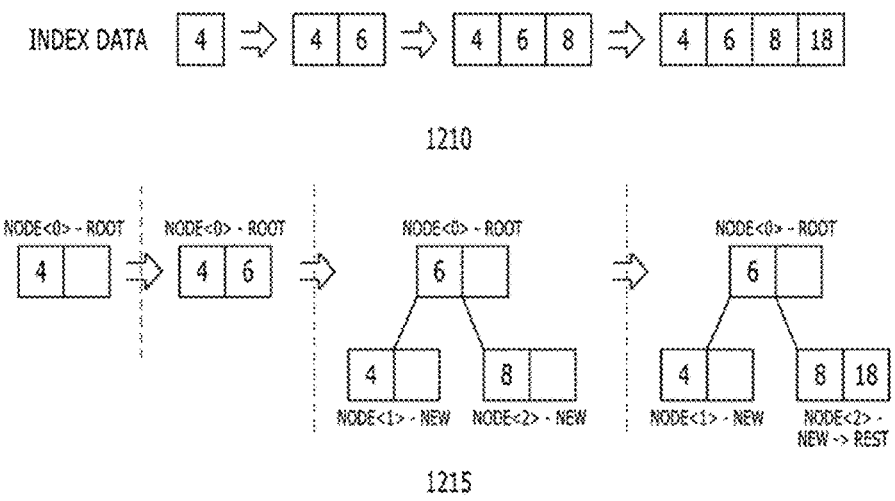
FIGS. 12A and 12F illustrate examples of a balance tree (B-tree) structure according to embodiments of the present invention.
Figure 12B:
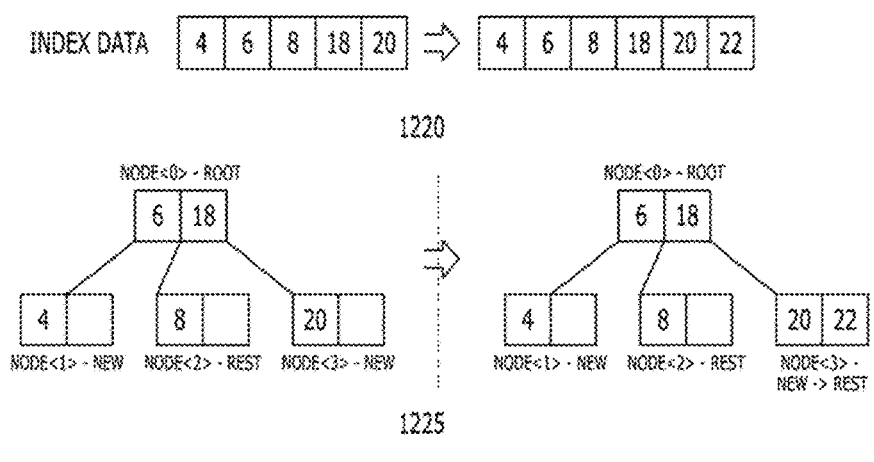
Figure 12C:
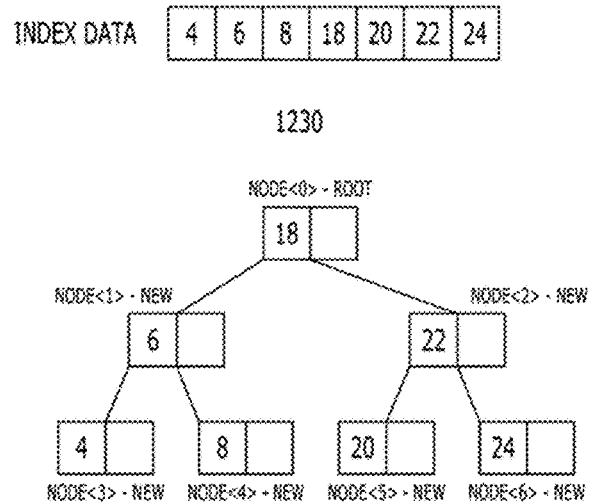
Figure 12D:
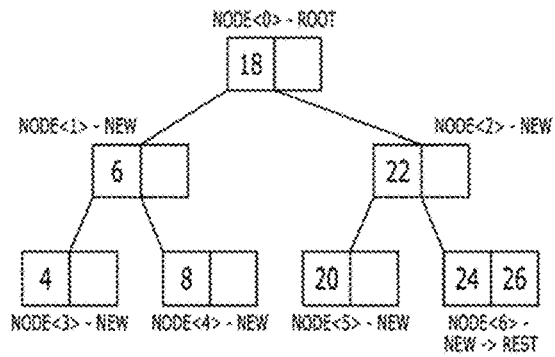
Figure 12E:
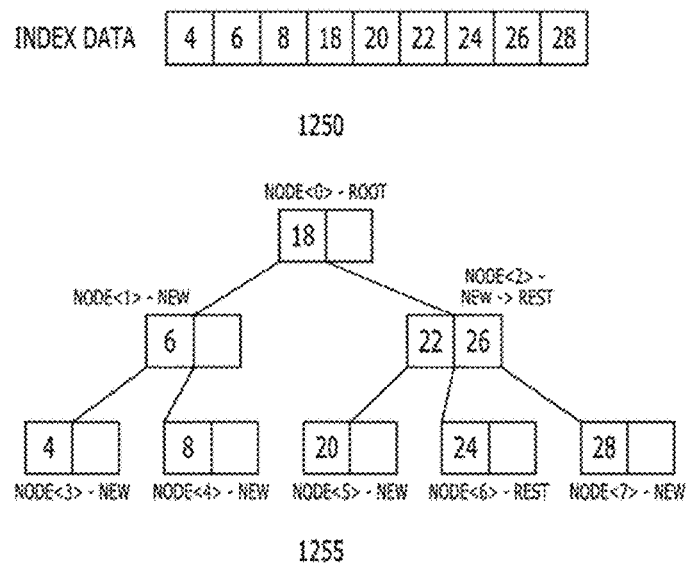
Figure 12F:
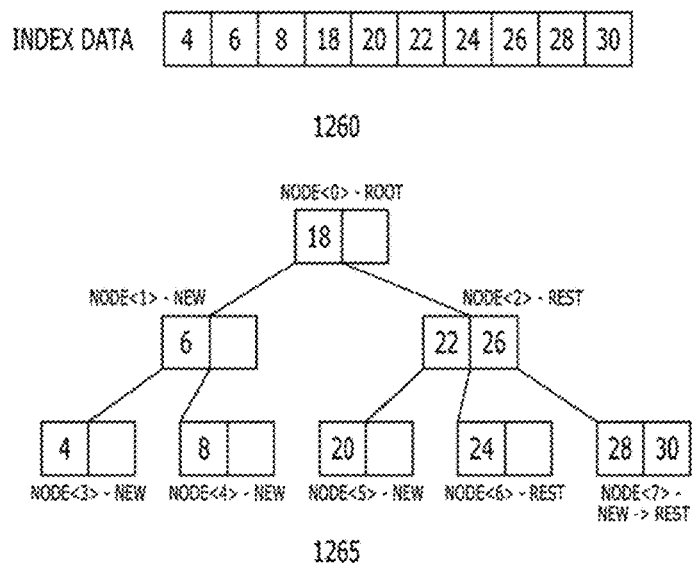

FIGS. 12A and 12F illustrate an example of the B-tree structure employed for managing a plurality of index data in the data processing system 100, according to an embodiment of the present invention.

The B-tree structure may be defined as follows.

First, a plurality of nodes may be configured to have a tree structure and one node may include from one to H index data where H is an integer equal to or larger than two.

Second, each of the nodes which are not leaf nodes among the plurality of nodes may include child nodes of which the number ranges from H/2 to H+1 the leaf nodes being set to the deepest tree level and having no child nodes, and the value of index data included in the corresponding node may correspond to a value obtained by dividing the value of index data included in two or more data nodes.

Third, the root node which is set to the shallowest tree level and has no parent node among the plurality of nodes may have two or more child nodes.

Fourth, all leaf nodes may have the same tree level.

Referring to 12A, index data having a value of 4 may be inputted at first, followed by index data having a value of 6, index data having a value of 8, and index data having a value of 18 in a sequential manner in the recited order as indicated by 1210. That is, FIG. 12A illustrates the state in which four data of 4, 6, 8, and 18 in total are inputted.

In this way, the input of index data as indicated by 1210 may form a B-tree structure as indicated by 1215.

Specifically, when the first index having a value of 4 is inputted, the first index data may be stored in the zeroth node NODE<0> serving as the root node ROOT, as indicated by 1215. At this time, although the zeroth node NODE<0> is a newly generated node the zeroth node NODE<0> is not sorted into a new node because the zeroth node NODE<0> is the root node ROOT.

Then, the second index data having a value of 6 may be inputted and stored in the zeroth node NODE<0> serving as the root node.

In this way, since the two index data of 4 and 6 maybe stored in one node or the zeroth node NODE<0> serving as the root rood ROOT until the two index data are inputted, there exists no child node. This is because the B-tree illustrated in FIG. 12A stores a maximum of two data in one node. When a larger number of data than two data may be stored in one node, there exist no child nodes until the larger number of data are stored in the root node.

Then, when the third index data having a value of 8 is inputted, the data having been stored in the root node may be changed into a structure having two child no des based on the values thereof, because the root node has no space to store the third index data.

That is, the index data having a value of 6, corresponding to the intermediate value among the index data of 4, 6, and 8 which are attempted to be stored in the root node ROOT, may be stored in the root node ROOT. Based on the index data having a value of 6 and stored in the root node ROOT, the index data having a value of 4 may be stored in the first node NODE<1>, and the index data having a value of 8 may be stored in the second node NODE<2>. At this time, since the first node NODE<1> and the second node NODE<2> are child nodes and newly generated nodes, the first node NODE<1> and the second node NODE<2> are sorted into new no des NEW.

Then the fourth index data having a value of 18 may be inputted and stored in the second node NODE<2>. In this way, as the index data having a value of 18 is additionally stored in the second node NODE<2>, the second node NODE<2> is not sorted into a new node NEW, but sorted into a rest node REST.

According to the embodiment of FIG. 12B, fifth index data having a value of 20 may be inputted following the index data of 4, 6, 8, and 18 which were inputted in FIG. 12A, and sixth index data having a value of 22 may be then inputted as indicated by 1220.

In this way, the input of index data as indicated by 1220 may form a B-tree structure as indicated by 1225.

Specifically, when the fifth index data having a value of 20 is inputted as indicated by 1225, the data having been stored in the second node NODE<2> may be attempted to be moved to the root node ROOT which is the parent node thereof, because the second node NODE<2> has no space to store the fifth index data. At this time, since the root node ROOT has a space to store the fifth index data, the data having been stored in the second node NODE<2> may be moved to the root node ROOT, and the B-tree structure may be changed into a structure having two child nodes based on the value of the moved data.

That is, the index data having a value of 18, corresponding to the intermediate value among the index data of 8, 18, and 20 which are attempted to be stored in the second node NODE<2>, may be moved and stored in the root node ROOT. Based on the index data having a value of 18 and stored in the root node ROOT, the index data having a value of 8 may be stored in the second node NODE<2>, and the index data having a value of 20 may be stored in the third node NODE<3>. At this time, since the third node NODE<3> is a child node and a newly generated node, the third node NODE<3> may be sorted into a new node NEW. Furthermore, since the second node NODE<2> is already sorted into the rest node REST as illustrated in FIG. 12A, the second node NODE<2> may continuously maintain the state in which the second node NODE<2> is sorted into the rest node REST even in FIG. 12B.

Then, the sixth index data having a value of 22 may be inputted and stored in the third node NODE<3>. In this way, as the index data having a value of 22 is additionally stored in the third node NODE<3>, the third node NODE<3> is not sorted into a new node NEW, but sorted into a rest node REST.

According to the embodiment of FIG. 12C, seventh index data having a value of 24 may be inputted following the index data of 4, 6, 8, 18, 20, and 22 which were inputted in FIGS. 12A and 12B, as indicated by 1230.

In this way, the input of index data a indicated by 1230 may form a B-tree structure as indicated by 1235.

Specifically, when the seventh index data having a value of 24 is inputted as indicated by 1235, the data having been stored in the third node NODE<3> may be attempted to be moved to the root node ROOT, because the third node NODE<3> has no space to store the seventh index data. At this time, since the root node ROOT has no space to store the seventh index data, a new root node may be formed while the data having been stored in the root node ROOT are moved to a one-step higher level, and the B-tree structure may be changed to a structure having six child nodes around the newly formed root node.

That is, although the index data having a value of 22, corresponding to the intermediate value among the index data of 20, 22, and 24 which are attempted to be stored in the third node NODE<3>, is attempted to be stored in the root node ROOT which is, the parent node thereof, the index data having a value of 22 cannot be stored in the root node ROOT because the root node ROOT has no space. Thus, the index data having a value of 18, corresponding to the intermediate value among the index data of 6, 18 and 22 which a attempted to be stored in the root node ROOT, may be moved to the one-step higher level and set to a new root node ROOT. At this time, the index data of 6 and 22, which had been stored in the previous root node ROOT, may be stored in the new first node NODE<1> and the new second node NODE<2>, respectively based on the index data of 18 stored in the new root node ROOT.

Furthermore, the index data of 4 and 8, which had been stored in the previous second and third nodes NODE<2> and NODE<3> serving as the child nodes of index data having a value of 6 in the previous root node ROOT, may be moved and stored in the new third and fourth nodes NODE<3> and NODE<4> which are newly set to child nodes of the first node NODE<1> in which the index data having a value of 6 is stored, respectively.

Furthermore, since the index data having a value of 22, which had been stored in the previous third node NODE<3> and attempted to be moved and stored in the previous root node ROOT, is stored in the new second node NODE<2>, the index data having a value of 20, which had been stored in the previous third node NODE<3>, and the index data having a value of 24, which had been attempted to be stored in the previous third node NODE<3>, may be stored in new fifth and sixth node NODE<5> and NODE<6>, respectively, based on the new second node NODE<2>.

As described above, all of the child nodes under the root node ROOT in the B-tree structure illustrated in FIG. 12C may be sorted into new nodes NEW, because the root node ROOT is newly set.

According to the embodiment of FIG. 12D, eighth index data having a value of 26 may be inputted following the index data of 4, 6, 8, 18, 20, 22, and 24 which were inputted in FIGS. 12A and 12B, as indicated by 1240.

In this way, the input of index data as indicated by 1240 may form a B-tree structure as indicated by 1245.

Specifically, when the eighth index data having a value of 26 is inputted as indicated by 1245, the eighth index data may be stored in the sixth node NODE<6>, because the sixth node NODE<6> has a space to store the eighth index data. As the index data having a value of 26 is additionally stored in the sixth node NODE<6>, the sixth node NODE<6> is not sorted into a new node NEW, but sorted into a rest node REST.

According to the embodiment of FIG. 12E, ninth index data having a value of 28 may be inputted following the index data of 4, 6, 8, 18, 20, 22, 24, and 26 having been inputted in FIGS. 12A to 12D, as indicated by 1250.

In this way, the input of index data as indicated by 1250 may have a B-tree structure as indicated by symbol 1255.

Specifically, when the ninth index data having a value of 28 is inputted as indicated by 1255, the data having been stored in the sixth node NODE<6> may be attempted to be moved to the second node NODE<2> which is the parent node thereof, because the sixth node NODE<6> has no space to store the eighth index data. At this time, since the second node NODE<2> has a space to store the eighth index data, the data having been stored in the sixth node NODE<6> may be moved to the second node NODE<2>, and the B-tree structure may be changed to a structure having two child nodes based on the value of the moved data.

That is, the index data having a value of 26, corresponding to the intermediate value among the index data of 24, 26, and 28 which are attempted to be stored in the sixth node NODE<6>, may be moved and stored in the second node NODE<2>. Based on the index data of 26 stored in the second node NODE<2>, the index data having a value of 24 may be stored in the sixth node NODE<6>, and the index data having a value of 28 may be stored in a seventh node NODE<7>. At this time, since the seventh node NODE<7> is a child node and a newly generated node the seventh node NODE<7> may be sorted into a new node NEW. Furthermore, since the sixth node NODE<6> is already sorted into a rest node REST as illustrated in FIG. 12D, the sixth node NODE<6> may continuously maintain the state in which the sixth node NODE<6> is sorted into a rest node REST even in FIG. 12E. As the index data having a value of 26 is additionally stored in the second node NODE<2>, the second node NODE<2> is not sorted into a new node NEW, but sorted into a rest node REST.

According to the embodiment of FIG. 12F, tenth index data having a value of 30 may be inputted following the index data of 4, 6, 8, 18, 20, 22, 24, 26, and 28 which were inputted in FIGS. 12A to 12E, as indicated by 1260.

In this way, the input of index data as indicated by 1260 may have a B-tree structure as indicated by 1270.

Specifically, when the tenth index data having a value of 30 is inputted as indicated by 1270, the tenth index data may be stored in the seventh node NODE<7>, because the seventh node NODE<7> has a space to store the tenth index data. As the index data having a value of 30 is additionally stored in the seventh node NODE<7>, the seventh node NODE<7> may not be sorted into a new node NEW, but sorted into a rest node REST.

As described with reference to FIGS. 12A to 12F, all of the nodes included in the B-tree structure may be included in the new nodes NEW or the rest nodes REST, as long as the nodes are not the root node ROOT.

At this time, the new node NEW may indicate the state in which a node is newly formed during an arithmetic operation in which index data is changed, and nave the characteristic that valid data is stored only in a one half of the entire size of the node.

Specifically, according to the embodiment of FIG. 12A, a maximum of two index data may be stored in each of the first and second nodes NODE<1> and NODE<2> at the point of time that the first and second nodes NODE<1> and NODE<2> are sorted into new nodes NEW, but only one index data or the index data of 4 or 8 may be stored in each of the first and second nodes NODE<1> and NODE<2> in order to maintain the B-tree structure. Furthermore, the second node NODE<2> may be switched to a rest node REST at the point of time that the index data having a value of 18 is added to the second node NODE<2>. At this time, since no data is added to the first node NODE<1>, the first node NODE<1> may be continuously sorted into a new node NEW.

According to the embodiment of FIG. 12B, a maximum of two index data may be stored in the third node NODE<3> at the point of time that the third node NODE<3> is sorted into a new node NEW, but only one index data or the index data of 20 may be stored in the third node NODE<3> in order to maintain the B-tree structure. Furthermore, the second node NODE<2> which has been sorted into a rest node REST in FIG. 12A may be continuously sorted into a rest node REST even in the state where only a one half of the data remains as the third node NODE<3> is formed in FIG. 12B. Then, the third node NODE<3> may be switched to a rest node REST at the point of time that the index data having a value of 22 is added to the third node NODE<3>. At this time, since no data is added to the first node NODE<1>, the first node NODE<1> may be continuously sorted into a new node NEW.

Furthermore, while the B-tree structure illustrated in FIG. 12B is changed to the B-tree structure illustrated in FIG. 12C, a root node ROOT may be newly defined. Thus, most nodes under the root node ROOT may be sorted into new nodes NEW. That is, although a maximum of two index data may be stored in each of the first to sixth nodes NODE<1:6> at the point of time that the first to sixth nodes NODE<1:6> are sorted into new nodes NEW, only one index data or the index data having a value of 4, 6, 8, 20, 22, or 24 may be stored in each of the first to sixth nodes NODE<1:6>, in order to maintain the B-tree structure.

Furthermore, the sixth node NODE<6> may be switched to a rest node REST at the point of time that the index data having a value of 26 is added to the sixth node NODE<6> in FIG. 12D. At this time, since no data is added to the first to fifth nodes NODE<1:5>, the first to fifth nodes NODE<1:5> may be continuously sorted into new nodes NEW.

According to the embodiment of FIG. 12E, a maximum of two index data may be stored in the seventh node NODE<7> at the point of time that the seventh node NODE<7> is sorted into a new node NEW, but only one index data or the index data of 28 may be stored in the seventh node NODE<7> in order to maintain the B-tree structure. Furthermore, the sixth node NODE<6> which has been sorted into a rest node REST in FIG. 12D may be continuously sorted into a rest node REST even in the state where only a one half of the data remains as the seventh node NODE<7> is formed in FIG. 12D. Furthermore, the second node NODE<2> may be switched to a rest node REST at the point of time that the index data having a value of 26 is added to the second node NODE<2>. At this time, since no data is added to the first node NODE<1> and the third to sixth nodes NODE<3:6>, the first node NODE<1> and the third to sixth nodes NODE<3:6> may be continuously sorted into new nodes NEW.

According to the embodiment of FIG. 2F, the seventh node NODE<7> may be switched to a rest node REST at the point of time that the index data having a value of 30 is added to the seventh node NODE<7>. Furthermore, the second and sixth nodes NODE<2> and NODE<6> having been sorted into the rest nodes REST in FIG. 12E may be continuously sorted into the rest nodes REST even at the point of time that data is added to the seventh node NODE<7> in FIG. 12F. At this time, since no data is added to the first node NODE<1> and the third to sixth nodes NODE<3:6>, the first node NODE<1> and the third to sixth nodes NODE<3:6> may be continuously sorted into new nodes NEW.

When a node is sorted into a rest node REST in the B-tree structure, it may be impossible to determine whether valid data are stored in only a one half of the internal storage space of the node or all of the internal storage space of the node. However, when a node is sorted into a new node NEW, it is possible to determine that valid data are stored in only a one half of the internal storage space of the node.

Figure 13:
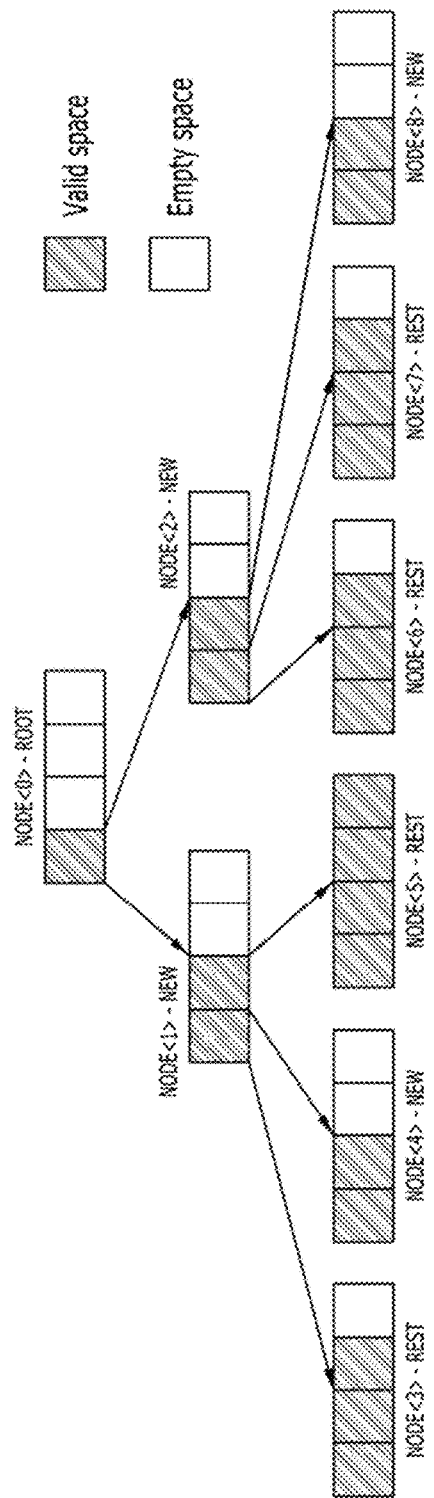
FIG. 13 is a diagram illustrating a plurality of index data managed in a balance tree (B-tree) structure by a host in a data processing system, according to embodiments of the present invention.

FIG. 13 is a diagram illustrating a plurality of index data managed in a balance tree (B-tree) structure by a host in a data processing system, according to embodiments of the present invention.

<First Embodiment>

Figure 14:
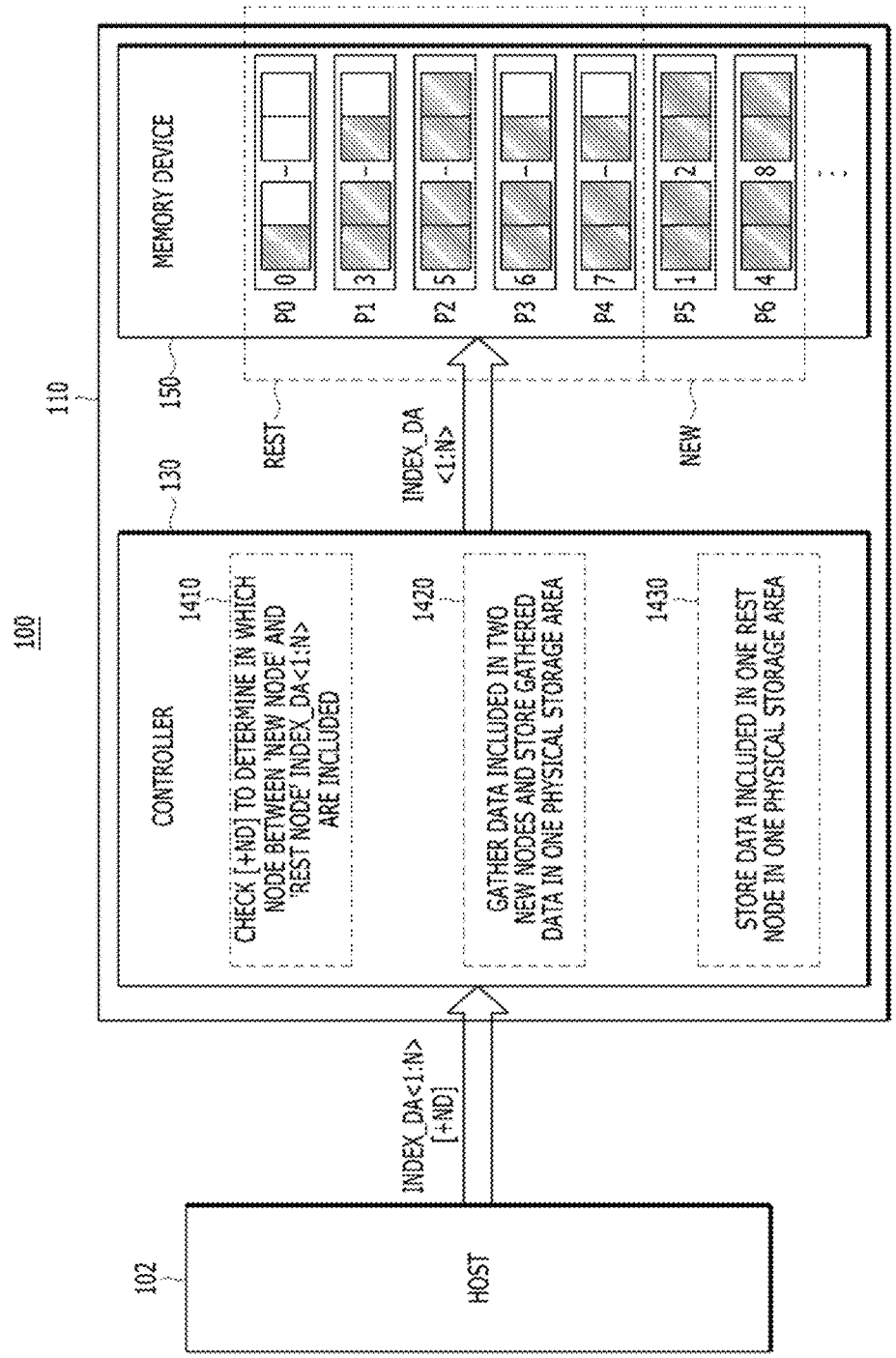
FIG. 14 is a diagram of a data processing system according to a first embodiment of the present invention.

FIG. 14 illustrates a configuration of the data processing system 100 for performing an operation of managing index data, according to a first embodiment of the present invention, by referring to the configuration of the data processing system 100 illustrated in FIG. 1. That is, the data processing system 100, according to the first embodiment of the present invention, may include a host 102 and a memory system 110. The memory system 110 may include a controller 130 and a nonvolatile memory device 150.

Referring to FIGS. 13 and 14, each of the plurality of index data INDEX_DA<1:N>[+ND] which are managed in a B-tree structure by the host 102 in the data processing system 100 may be stored in a different form depending on the state of the node in which the index data is positioned.

Specifically, each of index data INDEX_DA<1:N>[+ND] managed in a B-tree structure by the host 102 may include node information [+ND] on the node in which the index data is positioned. At this time, each node of the B-tree structure managed by the host 102 may be set to a state in which the node has a predetermined size.

The memory system 110 may have an internal physical storage space divided into a plurality of physical storage areas P0, P1, P2, P3, P4, P5, P6, . . . , each of which corresponds to the predetermined size. That is, the storage space of the memory device 150 included in the memory system 110 may be divided into the plurality of physical storage areas P0, P1, P2, P3, P4, P5, P6, . . . , each of which is set to the predetermined size.

For reference, when it is assumed that the predetermined size is 2, each of the nodes included in the B-tree structure illustrated in FIGS. 12A to 12F may store two index data. The predetermined size may be set to a number larger than 2, according to a designer's selection. Furthermore, the predetermined size may be set to the maximum size of data which may be written through one write operation in the memory device 150 included in the memory system 110. For example, when the memory device 150 is a nonvolatile memory device, the predetermined size may correspond to the maximum size of a page which may be written through one write operation.

FIGS. 13 and 14 illustrate an example in which a maximum of four index data are stored in each node of the B-tree structure under the supposition that the predetermined size is 4. That is, as illustrated in FIG. 14, each of the physical storage areas P0, P1, P2, P3, P4, P5, P6, . . . which are managed by the memory system 110 may store a maximum of four index data. Furthermore, as illustrated in FIG. 13, each of the nodes NODE<0:8> included in the B-tree structure managed by the host 102 may include a maximum of four data.

Thus, in the data processing system 100 illustrated in FIGS. 13 and 14, the maximum number of index data which may be stored in each of the nodes NODE<0:8> included in the B-tree structure managed by the host 102 is equal to the maximum number of index data which may be stored in each of the physical storage areas P0, P1, P2, P3, P4, P5, P6, . . . which are managed by the memory system 110.

The operation of the memory system 110 according to the first embodiment of the present invention will be described in more detail as follows.

First the memory system 110 may check the node information [+ND] of each of index data INDEX_DA<1:N>[+ND] applied from the host 102, and determine in which node between a new node NEW and a rest node REST each of index data INDEX_DA<1:N>[+ND] is included (1410).

For example, among the plurality of nodes NODE<0:8> managed by the host 102, the zeroth node NODE<0>, the third node NODE<3>, the fifth node NODE<5>, the sixth node NODE<6>, and the seventh node NODE<7> may be sorted into the rest nodes REST. Thus, each of index data included in the zeroth node NODE<0>, the third node NODE<3>, the fifth node NODE<5>, the sixth node NODE<6>, and the seventh node NODE<7> among the plurality of index data INDEX_DA<1:N>[+ND] transmitted to the memory system from the host 102 may contain node information [+ND] indicating that the corresponding node in including the index data is included in the rest nodes REST.

On the other hand, among the plurality of nodes NODE<0:8> managed by the host 102, the first node NODE<1>, the second node NODE<2>, the fourth node NODE<4>, and the eighth node NODE<8> may be sorted into new nodes NEW. Thus, each of index data included in the first node NODE<1>, the second node NODE<2>, the fourth node NODE<4>, and the eighth node NODE<8> among the plurality of index data INDEX_DA<1:N>[+ND] transmitted to the memory system 110 from the host 102 may contain node information [+ND] indicating that the corresponding node including the index data is included in the new nodes NEW.

As such, when the memory system 110 checks the node information [+ND] of each of index data INDEX_DA<1:N>[+ND] applied from the host 102, the memory system 110 may recognize in which node the corresponding index data is included.

The memory system 110 may gather two different index data sorted into new nodes NEW and store the gathered index data in one physical storage area P5 or P6, when the two different index data are checked as new nodes NEW among the plurality of index data INDEX_DA<1:N>[+ND] applied from the host 102 (1420).

The reason that the two index data sorted into new nodes NEW may be stored in one physical storage area P5 or P6 is that only a one half of the predetermined size is used when the index data are sorted into new nodes NEW as described with reference to FIGS. 12C to 12H, the predetermined size corresponding to the maximum number of index data which may be stored in each of the nodes managed in the B-tree structure.

That is, as illustrated in FIG. 13, the firs node NODE<1>, the second node<2>, the fourth node NODE<4>, and the eighth node NODE<8> which are sorted into new nodes NEW in the B-tree structure managed by the host 102 may be managed in such a manner that only a space including two index data among four index data corresponding to the maximum number of index data which may be stored in each of the nodes NODE<0:8> is set to a valid space, and the rest of the space is set to an empty space.

In the conventional method, when each of the nodes NODE<0:8> included in the B-tree structure managed by the host 102 occupies one physical storage area P0, P1, P2, P3, P4, P5, P6, or . . . in the memory system 110, each of the nodes NODE<1, 2, 4, 8> sorted into new nodes NEW should use the entire part of one physical storage area P0, P1, P2, P3, P4, P5, P6, or . . . , even though only the one half of the storage space of the node includes valid index data.

As illustrated in FIG. 14, however, the memory system 110 according to the first embodiment of the present invention may gather two nodes NODE<1, 2>/NODE<4, 8> among the nodes NODE<1, 2, 4, 8> sorted into new nodes NEW, and store the two nodes in one physical storage area P5 or P6. Thus, the physical storage area P5 or P6 in which the index data sorted into new nodes NEW are stored may be completely filled with four data corresponding to the maximum number of index data which may be stored in each node.

Since the memory system 110 recognizes that the data corresponding to the two nodes NODE<1, 2>/NODE<4, 8> are stored in the physical storage area P5 or P6 in which the index data sorted into new nodes NEW are stored, the memory system 110 may manage the index data sorted into new nodes NEW without any problem, even when the index data are updated into the rest nodes REST in the future.

The memory system 110 may store one index data sorted into a rest node REST in one physical storage area P0, P1, P2, P3, or P4, when the index data is checked as a rest node REST among the plurality of index data INDEX_DA<1:N>[+ND] applied from the host 102 (1430).

As such, when one index data sorted into a rest node REST is stored in one physical storage area P0, P1, P2, P3, or P4, the index data may be stored in the same manner as the conventional method.

For example, as illustrated in FIGS. 13 and 14, the index data included in the zeroth node NODE<0>, the third node NODE<3>, the fifth node NODE<5>, and the sixth node NODE<6>, which are sorted into the rest nodes REST in the B-tree structure managed by the host 102, may be stored in the zeroth to fourth physical storage areas P<0:4>, respectively, among the plurality of physical storage areas P0, P2, P2, P3, P4, P5, P6, . . . which are included in the memory system 110.

FIG. 15 illustrates that a method for mapping the logical address and physical address of index data included in a new node NEW in the data processing system 100 illustrated in FIGS. 13 and 14 is different from a method for mapping the logical address-physical address of index data included in a rest node REST.

In the table illustrated in FIG. 15, each of the nodes NODE<0:8> may be represented by a 'logical address'.

Specifically, logical addresses indicating the respective index data INDEX_DA<1:N>[+ND] may have different values. In FIG. 15, however, one logical address may be given to each of the nodes NODE<0:8>, regardless of the number of index data included in each of the nodes NODE<0:8>.

For example, referring to FIGS. 13 and 14, the third node NODE<3> may include three index data. At this time, each of the three index data included in the third node NODE<3> may have a different logical address. In the table illustrated in FIG. 15, however, since three index data have something in common in that the three index data are included in the third node NODE<3>, the three index data may be bound and written as one table value.

In the table illustrated in FIG. 15, only a value for identifying a physical storage area and a specific value may be selectively written as 'physical address'. Hereafter, the value for identifying a physical storage area will be referred to as a physical storage area identification value.

First, the physical addresses indicating the plurality of physical storage areas P0, P1, P2, P3, P4, P5, P6, . . . , respectively, may have different values.

For example, among the plurality of physical storage areas P0, P1, P2, P3, P4, P5, P6, . . . , the physical address value indicating the zeroth physical storage area P0 may be set to 0, the physical address value indicating the first physical storage area P1 may be set to 1, the physical address value indicating the second physical storage area P2 may be set to 2, the physical address value indicating the third physical storage area P3 may be set to 3, the physical address value indicating the fourth physical storage area P4 may be set to 4, the physical address value indicating the fifth physical storage area P5 may be set to 5, the physical address value indicating the sixth physical storage area P6 may be set to 6, the physical address value indicating the seventh physical storage area P7 may be set to 7, and the physical address value indicating the eighth physical storage area P8 may be set to 8. In this way, the physical addresses indicating the respective physical storage areas P0, P1, P2, P3, P4, P5, P6, . . . may have different values.

At this time, although not illustrated in detail in FIG. 15, 'physical address' may include values of which the uses are not specifically defined, in addition to the values for identifying the plurality of physical storage areas P0, P1, P2, P3, P4, P5, P6, . . . . For example, when it is assumed that 'physical address' includes 32 bits, one bit or two bits of the 32 bits may be managed in a state where the use thereof is not specifically defined.

The memory system 110 according to the first embodiment of the present invention may connect two nodes NODE<1, 2>/NODE<4, 8> sorted into new nodes NEW to a physical storage area P0, P1, P2, P3, P4, P5, P6, or . . . , using the specific value of which the use is not specifically defined 'physical address'.

For this operation, the memory system 110 may allocate two physical addresses, of which only specific values are different from each other, to a physical storage area P0, P1, P2, P3, P4, P5, P6, or . . . , and map the two physical addresses, of which only specific values are different from each other, to two different logical addresses indicating the two nodes NODE<1, 2>/NODE<4, 8> sorted into new nodes NEW.

For example, as illustrated in FIG. 15, the logical address indicating the data included in the first node NODE<1> sorted into a new node NEW may have a physical storage area identification value of 5 and a specific value of 0. Furthermore, the logical address indicating the data included in the second node NODE<2> sorted into a new node NEW may have a physical storage area identification value of 5 and a specific value of 1. As such, the first node NODE<1> and the second node NODE<2> sorted into new nodes NEW may have the same physical storage area identification value of 5, but have different specific values of 0 and 1. Thus, the first node NODE<1> and the second node NODE<2> sorted into new nodes NEW may be stored in one physical storage area P5 of the memory system 110, but the values of the respective nodes may be distinguished through the specific values.

Similarly, the logical address indicating the data included in the fourth node NODE<4> sorted into a new node NEW may have a physical storage area identification value of 6 and a specific value of 0. Furthermore, the logical address indicating the data included in the eighth node NODE<8> sorted into a new node NEW may have a physical storage area identification value of 6 and a specific value of 1. As such, the fourth node NODE<4> and the eighth node NODE<8> sorted into new nodes NEW may have the same physical storage area identification value of 5, but may have different specific values of 0 and 1. Thus, the fourth, node NODE<4> and the eighth node NODE<8> sorted into new nodes NEW may be stored in one physical storage area P6 of the memory system 110, but the values of the respective nodes may be distinguished through the specific values thereof.

At this time, the method for mapping two physical addresses, of which only the specific values are different from each other, to two different logical addresses indicating the two nodes NODE<1, 2>/NODE<4, 8> sorted into new nodes NEW will be described in more detail as follows.

The node information [+ND] included in each of index data INDEX_DA<1:N>[+D] applied from the host 102, may include identification (ID) information for identifying the node in which the corresponding index data is positioned and indication information (e.g., flag) indicating whether the node at which the index data is positioned is included in new nodes NEW or rest nodes REST.

In the case of index data having an ID value corresponding to the first node NODE<1> while including a flag value sorted into a new node NEW according to the node information [+ND], among the plurality of index data INDEX_DA<1:N>[+ND], the logical address indicating the corresponding index data may be mapped to a physical address having a specific value of 0 and a physical storage area identification value of 5.

In the case of index data having an ID value corresponding to the second node NODE<2> while including a flag value sorted into a new node NEW according to the node information [+ND], among the plurality of index data INDEX_DA<1:N>[+ND], the logical address indicating the corresponding index data may be mapped to a physical address having a specific value of 1 and a physical storage area identification value of 5.

Through the above-described process, the index data included in the first node NODE<1> and the second node NODE<2> which are sorted into new nodes NEW may be mapped to two physical addresses having the same physicals storage area identification value of 5 while having different specific values of 0 and 1. Thus, as illustrated in FIG. 14, the index data included in the first node NODE<1> and the second node NODE<2> which are sorted into new nodes NEW may be stored together in the fifth physical storage area P5.

Similarly, in the case of index data having an ID value corresponding to the fourth node NODE<4> while including a flag value sorted into a new node NEW according to the node information [+ND], among the plurality of index data INDEX_DA<1:N>[+ND], the logical address indicating the corresponding index data may be mapped to a physical address having a specific value of 0 and a physical storage area identification value of 6.

In the case of index data having an ID value corresponding to the eighth node NODE<8> while including a flag value sorted into a new node NEW according to the node information [+ND], among the plurality of index data INDEX_DA<1:N>[+ND], the logical address indicating the corresponding index data may be mapped to a physical address having a specific value of 1 and a physical storage area identification value of 6.

Through the above-described process, the index data included in the fourth node NODE<4> and the eighth node NODE<8> which are sorted into new nodes NEW may be mapped to two physical addresses having the same physical storage area identification value of 6 while having different specific values of 0 and 1. Thus, as illustrated in FIG. 14, the index data included in the fourth node NODE<4> and the eighth node NODE<8> which are sorted into new nodes NEW may be stored together in the sixth physical storage area P6.

In the memory system 110 according to the first embodiment of the present invention, the nodes NODE<0, 3, 5, 6, 7, 8> sorted into the rest nodes REST may not use a specific value of which the use is not specifically defined in 'physical address'. That is, the physical addresses mapped to the logical addresses indicating the data included in the nodes NODE<0, 3, 5, 6, 7, 8> sorted into the rest nodes REST may be set in a state where the physical addresses have only one specific value.

Specifically, as described above, the node information [+ND] included in each of index data INDEX_DA<1:N>[+ND] applied from the host 102 may include ID information (not illustrated) for identifying the node in which the corresponding index data is positioned, and flag information (not illustrated) indicating whether the node at which the index data is positioned is included in new nodes NEW or rest nodes REST.

In the case of index data having an ID value corresponding to the zeroth node NODE<0> while including a flag value sorted into a rest node REST according to the node information [+ND], among the plurality of index data INDEX_DA<1:N>[+ND], the logical address indicating the corresponding index data may be mapped to a physical address having a physical storage area identification value of 0 and a specific value of 0. At this time, a physical address having a physical storage area identification value of 0 and a specific value of 1 may be set so as not to be mapped to a logical address indicating any other node. Thus, as illustrated in FIG. 14, the index data included in the zeroth node NODE<0> sorted into a rest node REST may be solely stored in the zeroth physical storage area P0.

In the case of index data having an ID value corresponding to the third node NODE<3> while including a flag value sorted into a rest node REST according to the node information [+ND], among the plurality of index data INDEX_DA<1:N[+ND], the logical address indicating the corresponding index data may be mapped to a physical address having a physical storage area identification value of 1 and a specific value of 1. At this time, the physical address having a physical storage area identification value of 1 and a specific value of 1 may be set so as not to be mapped to a logical address indicating any other node. Thus, as illustrated in FIG. 14, the index data included in the third node NODE<3> sorted into a rest node REST may be solely stored in the first physical storage area P1.

In the case of index data having an ID value corresponding to the fifth node NODE<5> while including a flag value sorted into a rest node REST according to the node information [+ND], among the plurality of index data INDEX_DA<1:N>[+ND], the logical address indicating the corresponding index data may be mapped to a physical address having a physical storage area identification value of 2 and a specific value of 0. At this time, the physical address having a physical storage area identification value of 2 and a specific value of 1 may be set so as not to be mapped to a logical address indicating any other node. Thus, as illustrated in FIG. 14, the index data included in the fifth node NODE<5> sorted into a rest node REST may be solely stored in the second physical storage area P2.

In the case of index data having an ID value corresponding to the sixth node NODE<6> while including a flag value sorted into a rest node REST accord in g the node information [+ND] among the plurality of index data INDEX_DA<1:N[+ND], the logical address indicating the corresponding index data may be mapped to a physical address having a physical storage area identification value of 3 and a specific value of 0. At this time, the physical address having a physical storage area identification value of 3 and a specific value of 1 may be set so as not to be mapped to a logical address indicating any other node. Thus, as illustrated in FIG. 14, the index data included in the sixth node NODE<6> sorted into a rest node REST may be solely stored in the third physical storage area P3.

In the case of index data having an ID value corresponding to the seventh node NODE<7> while including a flag value sorted into a rest node REST according to the node information [+ND], among the plurality of index data INDEX_DA<1:N>[+ND], the logical address indicating the corresponding index data may be mapped to a physical address having a physical storage area identification value of 4 and a specific value of 0. At this time, the physical address having a physical storage area identification value of 4 and a specific value of 1 may be set so as not to be mapped to a logical address indicating any other node. Thus, as illustrated in FIG. 14, the index data included in the seventh node NODE<7> sorted into a rest node REST may be solely stored in the fourth physical storage area P4.

Figure 16:
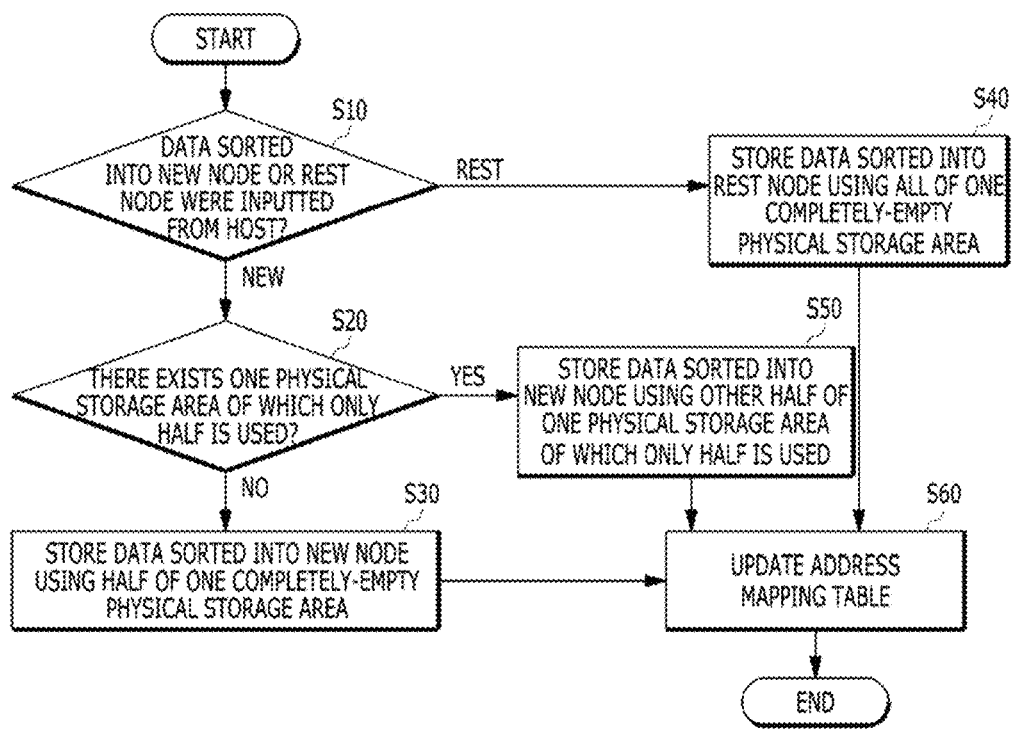
FIG. 16 is a flowchart illustrating an operation of a data processing system, according to a first embodiment of the present invention.

FIG. 16 is a flowchart illustrating the operation of the data processing system according to the first embodiment of the present invention.

FIG. 16 illustrates the sequence that the memory system 110 according to the first embodiment of the present invention stores a plurality of index data INDEX_DA<1:N>[+ND].

Specifically, the memory system 110 may check node information [+ND] included in each of index data INDEX_DA<1:N>[+ND] applied from the host 102, and determine whether index data sorted into a new node NEW were inputted or index data sorted into a rest node REST were inputted, at step S10.

At this time, when the plurality of index data INDEX_DA<1:N>[+ND] inputted from the host 102 are index data sorted into a new node NEW, the memory system 110 may check whether there exists a physical storage area of which only a one half is used, among the plurality of physical storage areas P0, P1, P2, P3, P4, P5, P6, . . . , which are managed in the memory system 110, at step S20. That is, the memory system 110 may check whether there exists a physical storage area of which only a one half is used because index data sorted into a new node NEW were previously stored therein, among the plurality of physical storage areas P0, P1, P2, P3, P4, P5, P6, . . . , which are managed in the memory system 110.

When there exist the physical storage areas of which only the one half is used, among the plurality of physical storage areas P0, P1, P2, P3, P4, P5, P6, . . . , the memory system 110 may store the index data sorted into a new node NEW, which were inputted at step S10, using the other half of the corresponding physical storage area, at step S50.

On the other hand, when there exist no physical storage areas of which only halves are used, among the plurality of physical storage areas P0, P1, P2, P3, P4, P5, P6, . . . , the memory system 110 may select one physical storage area which is completely empty among the plurality of physical storage areas P0, P1, P2, P3, P4, P5, P6, . . . , and store the index data sorted into a new node NEW, which were inputted at step S10, using a one half of the selected physical storage area, at step S30.

Furthermore, when the plurality of index data INDEX_DA<1:N>[+ND] inputted from the host 102 are index data sorted into a rest node REST, the memory system 110 may select one physical storage area which is completely empty, among the plurality of physical storage areas P0, P1, P2, P3, P4, P5, P6, . . . , and store the index data sorted into a rest node REST, which were inputted at step S10, using the entire part of the selected physical storage area, at step S40.

Through the operation S30, S40, or S50 of storing the index data sorted into a rest node REST or new node NEW, which were inputted at step S10, the memory system 110 may update the address mapping table at step S60.

As described above, when the index data sorted into the rest nodes REST among the plurality of index data managed in a B-tree structure are stored in a physical space, the data processing system according to the first embodiment of the present invention may store index data included in one rest node REST in one physical storage area. However, when the index data sorted into new nodes NEW are stored in a physical space, the data processing system may gather index data included in two new nodes NEW and store the gather index data in one physical storage area.

Thus, as illustrated below in FIG. 20, the physical space (new node area) which is occupied to store index data sorted into new nodes NEW in the memory system according to the first embodiment of the present invention may be reduced to a one half of the physical space in the conventional memory system (30%→15%).

<Second Embodiment>

FIG. 17 illustrates the configuration of the data processing system 100 for performing an operation of managing index data according to the second embodiment of the present invention, by referring to the configuration of the data processing system 100 illustrated in FIG. 1. That is, the data processing system 100 according to the second embodiment of the present invention may include a host 102 and a memory system 110. The memory system 110 may include a controller 130 and a nonvolatile memory device 150.

FIG. 18 is a diagram illustrating an example of mapping between logical addresses and physical addresses for index data in a data processing system according to a second embodiment of the present invention.

FIGS. 17 and 18 illustrate that each of index data INDEX_DA<1:N>[+ND] managed in a B-tree structure by the host 102 in the data processing system 100 according to the second embodiment of the present invention is stored in a different form depending on the state of the node in which the corresponding index data is positioned.

Specifically, each of index data INDEX_DA<1:N>[+ND] managed in a B-tree structure by the host 102 may include node information [+ND] on the node in which the index data is positioned. At this time, each node of the B-tree structure managed by the host 102 may be set to a state in which the node has a first size.

The memory system 110 may having an internal physical storage space divided into a plurality of physical storage areas P0, P1, P2, P3, P4, P5, P6, P7, P8, P9, P10, P11, P12, P13 . . . , each of which corresponds to a second size. That is, the storage space of the memory device 150 included in the memory system 110 may be divided into the plurality of physical storage areas P0, P1, P2, P3, P4, P5, P6, P7, P8, P9, P10, P11, P12, P13 . . . , each of which is set to a second size.

At this time, the first size may be twice larger than the second size.

When it is assumed that the first size is 2, each of the nodes included in the B-tree structure may store two index data as illustrated in FIGS. 12A to 12F. At this time, the second size may be set to 1. However, the first size may also be set to a number larger than 2, according to a designer's election.

Furthermore, the second size may be set to the maximum size of data which may be written through one write operation in the memory device 150 included in the memory system 110. For example, when the memory device 150 is a nonvolatile memory device, the second size may correspond to the maximum size of a page which may be written through one write operation.

Thus, two physical storage areas may be used to store index data included in one node among the plurality of nodes NODE<0:8> included in the B-tree structure.

FIGS. 17 and 18 illustrate an example in which a maximum of four index data are stored in each node of the B-tree structure under the supposition that the first size is 4. At this time, the second size may be set to 2.

Thus, as illustrated in FIG. 17, each of the physical storage areas P0, P1, P2, P3, P4, P5, P6, P7, P8, P9, P10, P11, P12, P13 . . . which are managed by the memory system 110 may store a maximum of two index data.

Furthermore, as illustrated in FIG. 18, each of the nodes NODE<0:8> included in the B-tree structure managed by the host 102 may include a maximum of four data.

Thus, in the data processing system 100 illustrated in FIGS. 17 and 18, the maximum number of index data which may be stored in each of the nodes NODE<0:8> included in the B-tree structure managed by the host 102 may be twice larger than the maximum number of index data which may be stored in each of the physical storage areas P0, P1, P2, P3, P4, P5, P6, P7, P8, P9, P10, P11, P12, P13 . . . which are managed by the memory system 110.

Therefore, each of the nodes NODE<0:8> included in the B-tree structure managed by the host 102 may be set to correspond to two physical storage areas among the plurality of physical storage areas P0, P1, P2, P3, P4, P5, P6, P7, P8, P9, P10, P11, P12, P13 . . . . For example, the zeroth node NODE<0> among the plurality of nodes NODE<0:8> included in the B-tree structure may be set to correspond to the zeroth and first physical storage areas P0 and P1 among the plurality of physical storage areas P0, P1, P2, P3, P4, P5, P6, P7, P8, P9, P10, P11, P12, P13, . . . , and the third no de NODE<3> may be set to correspond to the second and third physical storage areas P3 and P4 among the plurality of physical storage areas P0, P1, P2, P3, P4, P5, P6, P7, P8, P9, P10, P11, P12, P13 . . . .

The operation of the memory system 110 according to the second embodiment of the present invention will be described in more detail as follows.

First, the memory system 110 may check the node information [+ND] of each of index data INDEX_DA<1:N>[+ND] applied from the host 102, and determine in which node between a new node NEW and a rest node REST each of index data INDEX_DA<1:N>[+ND] is included.

For example, among the plurality of nodes NODE<0:8> managed by the host 102, the zeroth node NODE<0>, the third node NODE<3>, the fifth node NODE<5>, the sixth node NODE<6>, and the seventh node NODE<7> may be sorted into the rest nodes REST. Thus, each of index data included in the zeroth node NODE<0>, the third node NODE<3>, the fifth node NODE<5>, the sixth node NODE<6>, and the seventh node NODE<7> among the plurality of index data INDEX_DA<1:N>[+ND] transmitted to the memory system from the host 102 may contain node information [+ND] indicating that the node including the corresponding index data is included in rest nodes REST.

On the other hand, among the plurality of nodes NODE<0:8> managed by the host 102, the first node NODE<1>, the second node NODE<2>', the fourth node NODE<4>, and the eighth node NODE<8> may be sorted into new nodes NEW. Thus, each of index data included in the first node NODE<1>, the second node NODE<2>, the fourth node NODE<4>, and the eighth node NODE<8> among the plurality of index data INDEX_DA<1:N>[+ND] transmitted to the memory system 110 from the host 102 may contain node information [+ND] indicating that the node including the corresponding index data is included in new nodes NEW.

As such, when the memory system 110 checks the node information [+ND] of each of index data INDEX_DA<1:N>[+ND] applied from the host 102, the memory system 110 may recognize in which node the corresponding index data is included.

Furthermore, the memory system 110 may store one index data sorted into a rest node REST in two physical storage areas P0, P1/P2, P3/P4, P5/P6, P7/P8, P9, when the index data is checked as a rest node REST among the plurality of index data INDEX_DA<1:N>[+ND] applied from the host 102 (1730).

As such, when one index data sorted into a rest node REST are stored in two physical storage areas P0, P1/P2, P3/P4, P5/P6, P7/P8, P9, the index data may be stored in the same manner as the conventional method.

For example, as illustrated in FIGS. 17 and 18, the index data included in the zeroth node NODE<0> sorted into a rest node REST in the B-tree structure managed in the host 102 may be stored in the zeroth and first physical storage areas P0 and P1 among the plurality of physical storage areas P0, P1, P2, P3, P4, P5, P6, P7, P8, P9, P10, P11, P12, P13 . . . .

The index data included in the third node NODE<3> sorted into a rest node REST in the B-tree structure managed in the host 102 may be stored in the second and third physical storage areas P2 and P3 among the plurality of physical storage areas P0, P1, P2, P3, P4, P5, P6, P7, P8, P9, P10, P11, P12, P13 . . . .

The index data included in the fifth node NODE<5> sorted into a rest node R EST in the B-tree structure managed in the host 102 may be stored in the fourth and fifth physical storage areas P4 and P5 among the plurality of physical storage areas P0, P1, P2, P3, P4, P5, P6, P7, P8, P9, P10, P11, P12, P13 . . . .

The index data included in the sixth no de NODE<6> sorted into a rest node REST in the B-tree structure managed in the host 102 may be stored in the sixth and seventh physical storage areas P6 and P7 among the plurality of physical storage areas P0, P1, P2, P3, P4, P5, P6, P7, P8, P9, P10, P11, P12, P13 . . . .

The index data included in the seventh node NODE<7> sorted into a rest node REST in the B-tree structure managed in the host 102 may be stored in the eighth and ninth physical storage areas P8 and P9 among the plurality of physical storage areas P0, P1, P2, P3, P4, P5, P6, P7, P8, P9, P10, P11, P12, P13 . . . .

The memory system 110 may store one index data sorted into a new node NEW in one physical storage area P10, P11, P12, or P13, when the index data is checked as a new node NEW among the plurality of index data INDEX_DA<1:N>[+ND] applied from the host 102 (1720).

The reason that one index data sorted into a new node NEW may be stored in one physical storage area P10, P11, P12, or P13 is that only a one half of the first size is used, when the index data is sorted into a new node NEW as described with reference to FIGS. 12A to 12F, the first size corresponding to the maximum number of index data which may be stored in each of the nodes managed in the B-tree structure. In other words, that is because the number of index data sorted into a new node NEW always corresponds to the second size.

That is, as illustrated in FIG. 13, the first node NODE<1>, the second node<2>, the fourth node NODE<4>, and the eighth node NODE<8> which are sorted into new nodes NEW in the s-tree structure managed by the host 102 may be managed in such a manner that only a space including two index data among four index data corresponding to the maximum number of index data which may be stored in each of the nodes NODE<0:8> is managed as a valid space and the rest of the space is managed as an empty space.

Thus, in the conventional method, wren each of the nodes NODE<0:8> included in the B-tree structure managed by the host 102 occupies two physical storage areas P0, P1/P2, P3/P4, P5,P6, P7/P8, P9 . . . in the memory system 110, each of the nodes NODE<1 2, 4, 8> sorted into new nodes NEW should use all of two physical storage areas, even though only the one half of the storage space of the node includes valid index data.

However, the memory system 110 according to the second embodiment of the present invention may store one node NODE<1, 2, 4, or 8> in one physical storage area P10, P11, P12, or P13 as illustrated in FIG. 17 when the nodes NODE<1, 2, 4, 8> are sorted into new nodes NEW. Thus, the physical storage area P10, P11, P12, or P13 in which the index data sorted into a new node NEW are stored as illustrated in FIG. 17 is stored may be completely filled with two data corresponding to the maximum number of index data which may be stored therein.

Since the memory system 110 recognizes that the index data sorted into a new node NEW is stored only in one physical storage area P10, P11, P12, or P13, the memory system 110 may manage the index data sorted into a new node NEW without any problem even though the index data are updated into a rest node REST in the future.

FIG. 18 illustrates that a method for mapping the logical address and physical address of index data included in a new node NEW in the data processing system 100 illustrated in FIGS. 17 and 18 is different from a method for mapping the logical address-physical address of index data included in a rest node REST.

In the table illustrated in FIG. 18, each of the nodes NODE<0:8> may be represented by a 'logical address'.

Specifically, the logical addresses indicating the respective index data INDEX_DA<1:N>[+ND] may have different values. In FIG. 15B, however, a logical address may be given to each of the nodes NODE<0:8>, regardless of the number of index data included in each of the, nodes NODE<0:8>.

For example, referring to FIGS. 17 and 18, the third node NODE<3> may include three index data. At this time, each of the three index data included in the third node NODE<3> may have a different logical address. In the table illustrated in FIG. 18, however, since the three index data have something in common in that the three index data are included in the third node NODE<3>, the three index data may be bound and written as one table value.

In the table illustrated in FIG. 18, a 'physical address' may include only a physical storage area identification value.

The physical addresses indicating the plurality of physical storage areas P0, P1, P2, P3, P4, P5, P6, . . . , respectively, may have different values.

For example, among the plurality of physical storage areas P0, P1, P2, P3, P4, P5, P6, . . . , the physical address value indicating the zeroth physical storage area P0 may be set to 0, the physical address, value indicating the first physical storage area P1 may be set to 1, the physical address value indicating the second physical storage area P2 may be set to 2, the physical address value indicating the third physical storage area P3 may be set to 3, the physical address value indicating the fourth physical storage area P4 may be set to 4, the physical address value indicating the fifth physical storage area P5 may be set to 5, the physical address value indicating the sixth physical storage area P6 may be set to 6, the physical address value indicating the seventh physical storage area P7 may be set to 7, and the physical address value indicating the eighth physical storage area P8 may be set to 8. In this way, the physical addresses indicating the respective physical storage areas P0, P1, P2, P3, P4, P5, P6, P7, P8, P9, P10, P11, P12, P13 . . . may have different values.

The memory system 110 according to the second embodiment of the present invention may map the node NODE<1, 2, 4, or 8> sorted into a new node NEW to a physical storage area P10, P11, P12 or P13.

Thus, the logical address indicating the data included in the first node NODE<1> sorted into a new node NEW may have a value of 10 as a physical storage area identification value.

Furthermore, the logical address indicating the data included in the second node NODE<2> sorted into a new node NEW may have a value of 11 as a physical storage area identification value.

Furthermore, the logical address indicating the data included in the fourth node NODE<4> sorted into a new node NEW may have a value of 12 as a physical storage area identification value.

Furthermore, the logical address indicating the data included in the eighth node NODE<8> sorted into a new node NEW may have a value of 13 as a physical storage area identification value.

At this time, the method for snapping the logical address indicating one node NODE<1, 2, 4, or 8> sorted into a new node NEW to a physical address may be described in more detail as follows.

First, the node information [+ND] included in each of index data INDEX_DA<1:N>[+ND] applied from the host 102 may include ID information (not illustrated) for identifying the node in which the corresponding index data is positioned, and flag information (not illustrated) indicating whether the node in which the index data is positioned is included in new nodes NEW or rest nodes REST.

In the case of index data having an ID value corresponding to the first node NODE<1> while including a flag value sorted into a new node NEW according to the node information [+ND], among the plurality of index data INDEX_DA<1:N>[+ND], the logical address indicating the corresponding index data may be mapped to a physical address having a physical storage area identification value of 10.

In the case of index data having an ID value corresponding to the second node NODE<2> while including a flag value sorted into a new node NEW according to the node information [+ND], among the plurality of index data INDEX_DA<1:N>[+ND], the logical address indicating the corresponding index data may be mapped to a physical address having a physical storage area identification value of 11.

In the case of index data having an ID value corresponding to the fourth node NODE<4> while including a flag value sorted into a new node NEW according to the node information [+ND], along the plurality of index data INDEX_DA<1:N>[+ND], the logical address indicating the corresponding index data may be mapped to a physical address having a physical storage area identification value of 12.

In the case of index data having an ID value corresponding to the eighth node NODE<8> while including a flag value sorted into a new node NEW according to the node information [+ND], among the plurality of index data INDEX_DA<1:N>[+ND], the logical address indicating the corresponding index data may be mapped to a physical address having a physical storage area identification value of 13.

Each of the nodes NODE<0, 3, 5, 6, 7, 8> sorted into the rest nodes REST may be mapped to two physical storage areas P0, P1/P2, P3/P4, P5/P6, P7/P8, P9.

Thus, the logical address indicating the index data included in the zeroth node NODE<0> sorted into a rest node REST may have two values of 0 and 1 as a physical storage area identification value.

Furthermore, the logical address indicating the index data included in the third node NODE<3> sorted into a rest node REST may have two values of 2 and 3 as a physical storage area identification value.

Furthermore, the logical address indicating the index data included in the fifth node NODE<5> sorted into a rest node REST may have two values of 4 and 5 as a physical storage area identification value.

Furthermore, the logical address indicating the index data included in the sixth node NODE<6> sorted into a rest node REST may have two values of 6 and 7 as a physical storage area identification value.

Furthermore, the logical address indicating the index data included in the seventh node NODE<7> sorted into a rest node REST may have two values of 8 and 9 as a physical storage area identification value.

At this time, the method for mapping the logical address indicating one node NODE<0, 3, 5, 6, 7 or 8> sorted into a rest node REST to two physical addresses may be described in more detail as follows.

Specifically, as described above, the node information [+ND] included in each of index data INDEX_DA<1:N>[+ND] applied from the host 102 may include ID information (not illustrated) for identifying the node in which the corresponding index data is positioned, and flag information (not illustrated) indicating whether the node in which the index data is positioned is included in new nodes NEW or rest nodes REST.

In the case of index data having an ID value corresponding to the zeroth node NODE<0> while including a flag value sorted into a rest node REST according to the node information [+ND], among the plurality of index data INDEX_DA<1:N>[+ND], a physical address having a physical storage area identification value of 0 may be mapped to a logical address indicating the upper half of the corresponding index data, and a physical address having a physical storage area identification value of 1 may be mapped to a logical address indicating the lower half of the corresponding index data. Thus, as illustrated in FIG. 17, the index data included in the zeroth node NODE<0> sorted into a rest node REST may be divided and stored in the zeroth physical storage area P0 and the first physical storage area P1.

In the case of index data having an ID value corresponding to the third node NODE<3> while including a flag value sorted into a rest node REST according to the node information [+ND], among the plurality of index data INDEX_DA<1:N>[+ND], a physical address having a physical storage area identification value of 2 may be mapped to a logical address indicating the upper half of the corresponding index data, and a physical address having a physical storage area identification value of 3 may be mapped to a logical address indicating the lower half of the corresponding index data. Thus, as illustrated in FIG. 17, the index data included in the third node NODE<3> sorted into a rest node REST may be divided and stored in the second physical storage area P2 and the third physical storage area P3.

In the case of index data having an ID value corresponding to the fifth node NODE<5> while including a flag value sorted into a rest node REST according to the node information [+ND], among the plurality of index data INDEX_DA<1:N>[+ND], a physical address having a physical storage area identification value of 4 may be mapped to a logical address indicating the upper half of the corresponding index data, and a physical address having a physical storage area identification value of 5 may be mapped to a logical address indicating the lower half of the corresponding index data. Thus, as illustrated in FIG. 17, the index data included in the fifth node NODE<5> sorted into a rest node REST may be divided and stored in the fourth physical storage area P4 and the fifth physical storage area P5.

In the case of index data having an ID value corresponding to the sixth node NODE<6> while including a flag value sorted into a rest node REST according to the node information [+ND], among the plurality of index data INDEX_DA<1:N>[+ND], a physical address having a physical storage area identification value of 6 may be mapped to a logical address indicating the upper half of the corresponding index data, and a physical address having a physical storage area identification value of 7 may be mapped to a logical address indicating the lower half of the corresponding index data. Thus, as illustrated in FIG. 17, the index data included in the sixth node NODE<6> sorted into a rest node REST may be divided and stored in the sixth physical storage area P6 and the seventh physical storage area P7.

In the case of index data having an ID value corresponding to the seventh node NODE<7> while including a flag value sorted into a rest node REST according to the node information [+ND], among the plurality of index data INDEX_DA<1:N>[+ND], a physical address having a physical storage area identification value of 8 may be mapped to a logical address indicating the upper half of the corresponding index data, and a physical address having a physical storage area identification value of 9 may be mapped to a logical address indicating the lower half the corresponding index data. Thus, as illustrated in FIG. 17, the index data included in the seventh node NODE<7> sorted into a rest node REST may be divided and stored in the eighth physical storage area P8 and the ninth physical storage area P9.

FIG. 19 is a flowchart illustrating an operation of the data processing system, according to the second embodiment of the present invention.

FIG. 19 illustrates a sequence that the memory system 110 stores a plurality of index data INDEX_DA<1:N>[+ND].

Specifically, the memory system 110 may check node information [+ND] included in each of index data INDEX_DA<1:N>[+ND] applied from the host 102, and determine whether index data sorted into a new node NEW were inputted or index data sorted into a rest node REST were inputted, at step S110.

At this time, when the plurality of index data INDEX_DA<1:N>[+ND] inputted from the host 102 are index data sorted into a new node NEW, the memory system 110 may select a physical storage area which is completely empty, among the plurality of physical storage areas P0, P1, P2, P3, P4, P5, P6, P7, P8, P9, P10, P11, P12, P13 . . . , and store the index data sorted into a rest node REST, which were inputted at step S10, using all of the selected physical storage area, at step S120.

Then, when the plurality of index data INDEX_DA<1:N>[+ND] inputted from the host 102 are index data sorted into a rest node REST, the memory system 110 may select two physical storage areas P0, P1/P2, P3/P4, P5/P6, P7/P8, P9 which are completely empty, among the plurality of physical storage areas P0, P1, P2, P3, P4, P5, P6, P7, P8, P9, P10, P11, P12, P13 . . . , and store the index data stored into the rest node REST, which were inputted at step S10, using all of the selected physical storage areas, at step S130.

Through the operation S120 or S130 of storing the index data sorted as a rest node REST or new node NEW, which were inputted at step S10, the memory system 110 may update the address mapping table at step S140.

As described above, when index data sorted into the rest nodes REST among the plurality of index data managed in a B-tree structure are stored in a physical space, the data processing system according to the second embodiment of the present invention may store index data included in one rest node REST in two physical storage areas. However, when index data sorted into new nodes NEW are stored in a physical space, the data processing system may store index data included in one new node NEW in one physical storage area.

Figure 20:
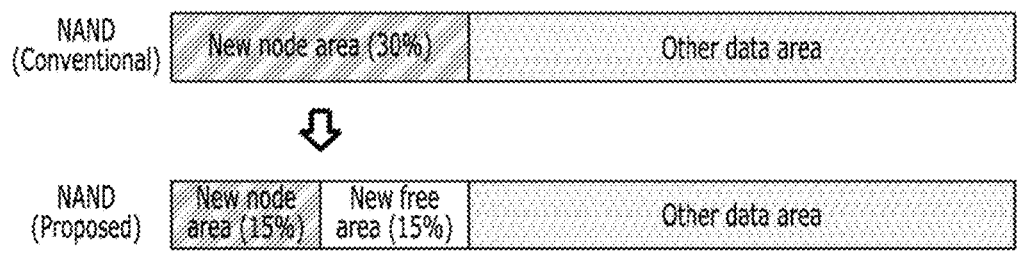
FIG. 20 is a diagram illustrating the effect of a data processing system, according to embodiments of the present invention.

Thus, as illustrated in FIG. 20, the physical space (new node area) which is occupied to store index data sorted into new nodes NEW in the memory system according to the first embodiment of the present invention may be reduced to a one half of the physical space in the conventional memory system (30%→15%).

According to embodiments of the present invention, the data processing system and the operation method thereof may differently control the method for storing index data included in new nodes among a plurality of index data into a physical space and the method for storing index data included in rest nodes which are not new nodes into a physical space.

Thus, the data processing system and the operation method thereof may minimize the size of a physical space occupied by data.

Although various embodiments have been described for illustrative purposes, it will be apparent to those skilled in the art that various changes and modifications may be made without departing from the spirit and/or scope of the invention as defined in the following claims.

What is claimed is:

1. A data processing system comprising:
   a host suitable for managing a plurality of data through a balance tree structure in which each node is set to a predetermined size, wherein each of the data includes information regarding the node in which the data is positioned, as node information; and
   a memory system having a plurality of physical storage areas each corresponding to the predetermined size, and suitable for gathering data included in two different new nodes based on the node information included in each of the data applied from the host, and storing the gathered data in one of the plurality of physical storage areas,
   wherein the memory system allocates two physical addresses, of which only specific values are different from each other, to the one of the plurality of physical storage areas, and then maps the two physical addresses, which are allocated to the one of the plurality of physical storage areas, to two different logical addresses indicating the two new nodes, respectively.

2. The data processing system of claim 1, wherein in the case of a rest node which is not the new node, the memory system stores data included in the rest node in one of the physical storage areas.

3. The data processing system of claim 2, wherein the node information comprises:
   identification (ID) information for identifying the node in which the corresponding data is positioned; and
   indication information indicating whether the node in which the data is positioned is the new node.

4. The data processing system of claim 3, wherein when the data included in the new node which is sorted according to the indication information, among the plurality of data, are sorted into data of a first node including ID information of a first value and data of a second node including ID information of a second value, the memory system maps the two physical addresses, of which only specific values are different from each other, to two different logical addresses indicating the first and second nodes, respectively.

5. The data processing system of claim 4, wherein when the data included in the rest node which is sorted according to the indication information, among the plurality of data, are sorted into data of a third node including ID information of a third value, the memory system allocates one physical address to the one of the physical storage areas, and maps the allocated physical address to one logical address indicating the third node.

6. A data processing system comprising:
a host suitable for managing a plurality of data through a balance tree structure in which each node is set to a first size, wherein each of the data includes information regarding the node in which the data is positioned, as node information; and
a memory system having a plurality of physical storage areas each corresponding to a second size which is a one half of the first size, and suitable for storing data included in one new node in one of the plurality of physical storage area based on the node information included in each of the data applied from the host, and storing data included in one rest node in two physical storage areas among the plurality of physical storage areas, the rest node indicating a node which is not the new node.

7. The data processing system of claim 6, wherein the node information comprises:
identification (ID) information for identifying the node in which the corresponding data is positioned; and
indication information indicating whether the node in which the data is positioned is the new node.

8. The data processing system of claim 7, wherein when the data included in the new node which is sorted according to the indication information, among the plurality of data, are sorted into data of a first node including ID information of a first value and data of a second node including ID information of a second value, the memory system maps two different physical addresses corresponding to the two different physical storage areas to two different logical addresses indicating the first and second nodes, respectively.

9. The data processing system of claim 8, wherein when the data included in the rest node which is sorted according to flag information, among the plurality of data, are sorted into data of a third node including ID information of a third value, the memory system maps any one of two different physical addresses corresponding to the two different physical areas to a logical address indicating the upper half of the third node, and maps the other physical address to a logical address indicating the lower half of the third node.

10. An operation method of a data processing system which includes a host suitable for managing a plurality of data through a balance tree structure in which each node is set to a predetermined size, wherein each of the data includes information regarding the node in which the data is positioned, as node information; and a memory system having a plurality of physical storage areas each corresponding to the predetermined size,
wherein an operation of the memory system comprises:
a separation step of separating the plurality of data into data included in a new node and data included in a rest node indicating a node which is not the new node, based on the node information included in each of the data applied from the host; and
a first storage step of gathering data included in two different new nodes and storing the gathered data in one of the plurality of physical storage areas, after the separation step,
wherein the first storage step comprises:
allocating two physical addresses, of which only specific values are different from each other, to the one of the plurality of physical storage areas; and
mapping the two physical addresses, which are allocated to the one of the plurality of physical storage areas, to two different logical addresses indicating the two new nodes, respectively.

11. The operation method of claim 10, wherein the memory system further comprises a second storage step of storing the data included in the rest node in one of the physical storage areas, after the separation step.

12. The operation method of claim 11, wherein the node information comprises:
identification (ID) information for identifying the node in which the corresponding data is positioned; and
indication information indicating whether the node in which the data is positioned is the new node.

13. The operation method of claim 12, wherein when the data included in the new node which is sorted with reference to the indication information at the separation step are sorted into data of a first node including ID information of a first value and data of a second node including ID information of a second value,
the mapping of the two physical addresses comprises mapping the two physical addresses, of which only specific values are different from each other, to two different logical addresses indicating the first and second nodes, respectively.

14. The operation method of claim 13, wherein when the data included in the rest node which is sorted with reference to the indication information at the separation step are sorted into data of a third node including ID information of a third value,
the second storage step comprises allocating one physical address to one of the physical storage areas, and mapping the allocated physical address to one logical address indicating the third node.

15. An operation method of a data processing system which includes a host suitable for managing a plurality of data through a balance tree structure in which each node is set to a first size, wherein each of the data includes information regarding the node in which the data is positioned, as node information; and a memory system having a plurality of physical storage areas each corresponding to a second size which is a one half of the first size,
wherein an operation of the memory system comprises:
a separation step of separating the plurality of data into data included in a new node and data included in a rest node indicating a node which is not the new node, based on the node information included in each of the data applied from the host;
a first storage step of storing data included in one new node in one of the plurality of physical storage areas after the separation step; and
a second storage step of storing data included in one rest node in two physical storage areas among the plurality of physical storage areas after the separation step.

16. The operation method of claim 15, wherein the node information comprises:
  identification (ID) information for identifying the node in which the corresponding data is positioned; and
  indication information indicating whether the node in which the data is positioned is the new node.

17. The operation method of claim 16, wherein when the data included in the new node which is sorted with reference to the indication information at the separation step are sorted into data of a first node including ID information of a first value and data of a second node including ID information of a second value,
  the first storage step comprises mapping two different physical addresses corresponding to the two physical storage areas to two different logical addresses indicating the first and second nodes, respectively.

18. The operation method of claim 17, wherein when the data included in the rest node which is sorted with reference to flag information at the separation step are sorted into data of a third node including ID information of a third value,
  the second storage step comprises mapping any one of two different physical addresses corresponding to the two different physical areas to a logical address indicating the upper half of the third node, and mapping the other physical address to a logical address indicating the lower half of the third node.

* * * * *